United States Patent
Uchikado et al.

(10) Patent No.: US 7,613,674 B2
(45) Date of Patent: Nov. 3, 2009

(54) DATA TRANSFER METHOD AND INFORMATION PROCESSING APPARATUS

(75) Inventors: Makoto Uchikado, Yokohama (JP); Kenichi Oyamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 11/455,816

(22) Filed: Jun. 20, 2006

(65) Prior Publication Data

US 2007/0266212 A1    Nov. 15, 2007

(30) Foreign Application Priority Data

Apr. 17, 2006    (JP)    .............................. 2006-112892

(51) Int. Cl.
*G06N 5/02* (2006.01)

(52) U.S. Cl. ........................... 706/50; 705/64; 709/223; 711/162

(58) Field of Classification Search ........................ None
See application file for complete search history.

(56) References Cited

U.S. PATENT DOCUMENTS

2004/0139278 A1*    7/2004    Uchiyama et al. ............ 711/114
2007/0162692 A1*    7/2007    Nishimoto et al. .......... 711/113

FOREIGN PATENT DOCUMENTS

JP    2005-222110    2/2004

* cited by examiner

*Primary Examiner*—David R Vincent
*Assistant Examiner*—Kalpana Bharadwaj
(74) *Attorney, Agent, or Firm*—Stites & Harbison PLLC; Juan Carlos A. Marquez, Esq.

(57) ABSTRACT

In a system for storing data as a backup purpose to a separate storage apparatus, data of a copy source is matched with data of a copy destination in a predetermined time. A host computer attaches an identifier to a write request and then transmits the resulting write request to another storage apparatus for every segment of business. The host computer calculates an amount of data which can be copied (backup) within a given time for every identifier, and then, issues a backup instruction to the storage apparatus.

20 Claims, 27 Drawing Sheets

FIG.2

111
- DATA SAVE DETERMINING PORTION — 201
- UNSENT DATA ACQUIRING PORTION — 202
- SAVING DATA DETERMINING PORTION — 203
- SAVING INSTRUCTION EXECUTING PORTION — 204

- DANGEROUS INFORMATION HOLDING TABLE — 211
- SITE LIST TABLE — 212
- DATA SAVING DESTINATION LIST TABLE — 213
- UNSENT DATA ACQUIRING TABLE — 214
- UNSENT DATA LIST TABLE — 215
- SAVING DATA LIST TABLE — 216

FIG.3A

| OCCURRENCE PREDICTION TIME INSTANT (301) | DISASTER SCALE (302) |
|---|---|
| 10:01:00 | 7 |

FIG.3B

| # | APPARATUS IDENTIFIER (311) | DISASTER WITHSTANDABLE PERMISSION VALUE (312) | DISASTER WITHSTANDABLE UPPER LIMIT VALUE (313) |
|---|---|---|---|
| 1 | 0001 | 5 | 6 |
| 2 | 0002 | 6 | 7 |

FIG.3C

| # | BUSINESS PROGRAM NAME (321) | DATA NAME (322) | COPY SOURCE APPARATUS IDENTIFIER (323) | COPY SOURCE VOL IDENTIFIER (324) |
|---|---|---|---|---|
| 1 | BUSINESS PROGRAM A | DB-A | 0001 | 1:02 |
| 2 | BUSINESS PROGRAM B | DB-B | 0001 | 1:03 |
| 3 | BUSINESS PROGRAM C | DB-C | 0001 | 1:04 |
| 4 | BUSINESS PROGRAM D | DB-D | 0001 | 1:06 |

FIG.3D

| # | COPY SOURCE APPARATUS IDENTIFIER (331) | COPY SOURCE VOL IDENTIFIER (332) | COPY DESTINATION APPARATUS IDENTIFIER (333) | COPY DESTINATION VOL IDENTIFIER (334) | COPY TYPE (335) | PRIORITY DEGREE (336) | DATA TRANSFER SPEED (337) |
|---|---|---|---|---|---|---|---|
| 1 | 0001 | 1:02 | 0002 | 2:02 | RC | 1 | 200 |
| 2 | 0001 | 1:03 | 0003 | 3:03 | RC | 2 | 200 |
| 3 | 0001 | 1:04 | 0002 | 2:04 | RC | 3 | 210 |
| 4 | 0001 | 1:04 | 0003 | 3:04 | JC | 4 | 220 |

FIG.3E

| # | COPY SOURCE APPARATUS IDENTIFIER (341) | COPY SOURCE VOL IDENTIFIER (342) | COPY DESTINATION APPARATUS IDENTIFIER (343) | COPY DESTINATION VOL IDENTIFIER (344) | ACQUISITION FLAG (345) |
|---|---|---|---|---|---|
| 1 | 0001 | 1:03 | 0003 | 3:03 | 1 |
| 2 | 0001 | 1:04 | 0003 | 3:04 | 1 |
| 3 | | | | | |

FIG.3F

| # | SEGMENTING IDENTIFIER (351) | TIME STAMP (352) | COPY SOURCE APPARATUS IDENTIFIER (353) | COPY SOURCE VOL IDENTIFIER (354) | COPY DESTINATION APPARATUS IDENTIFIER (355) | COPY DESTINATION VOL IDENTIFIER (356) | DATA AMOUNT (357) |
|---|---|---|---|---|---|---|---|
| 1 | A001 | 09:50:00 | 0001 | 1:03 | 0003 | 3:03 | 500 |
| 2 | A002 | 09:51:00 | 0001 | 1:03 | 0003 | 3:03 | 500 |
| 3 | A003 | 09:52:00 | 0001 | 1:03 | 0003 | 3:03 | 500 |
| 4 | B001 | 09:50:30 | 0001 | 1:04 | 0003 | 3:04 | 200 |
| 5 | B002 | 09:51:30 | 0001 | 1:04 | 0003 | 3:04 | 200 |
| 6 | B003 | 09:52:30 | 0001 | 1:04 | 0003 | 3:04 | 200 |
| ⋮ | ⋮ | ⋮ | ⋮ | ⋮ | ⋮ | ⋮ | ⋮ |

FIG.3G

| | | 366 | |
|---|---|---|---|
| 361 — | OCCURRENCE PREDICTION TIME INSTANT | 10:01:00 | UNSENT |
| 362 — | DISASTER SCALE | 7 | UNSENT |
| 363 — | DANGER ARRIVAL GRACE TIME INSTANT | 4 | UNSENT |
| 364 — | WRITE REFUSAL FLAG | 1 | UNSENT |
| 365 { 1 | SEGMENTING IDENTIFIER | A001 | UNSENT |
| | TIME STAMP | 9:50:00 | |
| | COPY SOURCE APPARATUS IDENTIFIER | 0001 | |
| | COPY SOURCE VOL IDENTIFIER | 1:03 | |
| | COPY DESTINATION APPARATUS IDENTIFIER | | |
| | COPY DESTINATION VOL IDENTIFIER | 3:03 | |
| | PRIORITY DEGREE | | |
| 2 | SEGMENTING IDENTIFIER | A001 | UNSENT |
| | TIME STAMP | 9:51:00 | |
| | COPY SOURCE APPARATUS IDENTIFIER | 0001 | |
| | COPY SOURCE VOL IDENTIFIER | 1:04 | |
| | COPY DESTINATION APPARATUS IDENTIFIER | 0003 | |
| | COPY DESTINATION VOL IDENTIFIER | 3:04 | |
| | PRIORITY DEGREE | | |
| | | | |
| | | | |

FIG.6A

| COMMAND | UNSENT DATA INFORMATION ACQUISITION PROGRAM EXECUTING COMMAND |
|---|---|
| DATA | COPY SOURCE APPARATUS IDENTIFIER |
| | COPY SOURCE VOL IDENTIFIER |
| | COPY DESTINATION APPARATUS IDENTIFIER |
| | COPY DESTINATION VOL IDENTIFIER |

FIG.6B

| COMMAND | REGISTER COMMAND/DELETE COMMAND |
|---|---|
| DATA | WRITE REFUSAL FLAG |
| | OCCURRENCE PREDICTION TIME INSTANT |
| | SUFFERED DISASTER SCALE |
| | DANGER ARRIVAL GRACE TIME |
| COMMAND | DATA SAVING PROGRAM EXECUTING COMMAND |
| DATA | SEGMENTING IDENTIFIER |
| | COPY SOURCE VOL IDENTIFIER |
| | COPY DESTINATION VOL IDENTIFIER |
| | TIME STAMP |
| | PRIORITY DEGREE |
| COMMAND | TRANSFER COMMAND |
| DATA | TRANSFER DESTINATION APPARATUS IDENTIFIER |
| COMMAND | REGISTER COMMAND/DELETE COMMAND |
| DATA | OCCURRENCE PREDICTION TIME INSTANT |
| | SUFFERED DISASTER SCALE |
| | DANGER ARRIVAL GRACE TIME |

FIG.10A

| | | | |
|---|---|---|---|
| 1001 | WRITE REFUSAL FLAG | | 1 |
| 1002 | DISASTER INFORMATION | OWN STORAGE APPARATUS | APPARATUS IDENTIFIER | 0001 |
| | | | DISASTER OCCURRENCE PREDICTION TIME INSTANT | 10:01:00 |
| | | | SUFFERED DISASTER SCALE | 7 |
| | | | DANGER ARRIVAL GRACE TIME | 4 |
| | | ANOTHER STORAGE APPARATUS | APPARATUS IDENTIFIER | |
| | | | | |
| | | | SUFFERED DISASTER SCALE | |
| | | | APPARATUS IDENTIFIER | |
| 1003 | PRIORITY CONTROL INFORMATION | | | |
| | | | PAIR INFORMATION | |
| 1004 | SNAPSHOT CONTROL INFORMATION | | DATA VOLUME IDENTIFIER | 1:06 |
| | | | STARTING TIME INSTANT | 2006/03/10 07:00:00 |
| | | | INTERVAL | 1hour |
| | | | DATA VOLUME IDENTIFIER | 1:30 |
| | | | STARTING TIME INSTANT | 2006/03/3 06:00:00 |
| | | | INTERVAL | 7day |
| 1005 | DATA RECOVERY CONTROL INFORMATION | | DATA VOLUME IDENTIFIER | |
| | | | RECOVERY TIME INSTANT | |
| | | | RECOVERY DATA VOLUME IDENTIFIER | |

FIG.10B

| # | TIME STAMP | SEGMENTING IDENTIFIER | ADDRESS | COPY SOURCE VOL IDENTIFIER | COPY DESTINATION VOL IDENTIFIER | PRIORITY FLAG |
|---|---|---|---|---|---|---|
| 1 | 09:49:15 | | | 1:02 | 2:02 | |
| 2 | 09:49:20 | | | 1:03 | 3:03 | |
| 3 | 09:49:25 | B001 | | 1:02 | 2:02 | |
| 4 | 09:49:40 | | | 1:03 | 3:03 | |
| 5 | 09:50:00 | A001 | | 1:03 | 3:03 | |
| 6 | 09:50:10 | | | 1:04 | 2:04 | |
| 7 | 09:50:20 | | | 1:03 | 3:03 | |
| 8 | 09:50:30 | C001 | | 1:04 | 2:04 | |
| 9 | 09:50:40 | | | 1:03 | 3:03 | |
| 10 | 09:51:00 | A001 | | 1:03 | 3:03 | |
| 11 | 09:50:10 | | | 1:04 | 3:04 | |
| 12 | 09:50:30 | C001 | | 1:04 | 3:04 | |
| 13 | 09:51:10 | | | 1:04 | 2:04 | |
| 14 | 09:51:15 | | | 1:02 | 2:02 | |
| 15 | 09:51:20 | | | 1:03 | 3:03 | |
| 16 | 09:51:25 | B001 | | 1:02 | 2:02 | |
| 17 | 09:51:30 | C001 | | 1:04 | 2:04 | |
| 18 | 09:51:40 | | | 1:03 | 3:03 | |
| 19 | 09:52:00 | A001 | | 1:03 | 3:03 | |
| 20 | 09:52:10 | | | 1:04 | 2:04 | |
| 21 | 09:52:20 | | | 1:03 | 3:03 | |
| 22 | 09:52:30 | C001 | | 1:04 | 2:04 | |

Column labels: 1011, 1012, 1013, 1014, 1015, 1016

FIG.10C

| VOLUME IDENTIFIER | SORT | STATUS |
|---|---|---|
| 1:01 | CONTROL COMMAND | USE |
| 1:02 | DATA | USE |
| 1:03 | DATA | USE |
| 1:04 | DATA | USE |
| 1:05 | JOURNAL DATA | USE |
| 1:06 | DATA | USE |
| 1:07 | DATA | USE |
| 1:08 | JOURNAL DATA | USE |
| 1:09 | SNAPSHOT DATA | USE |
| 1:10 | SNAPSHOT | USE |
| 1:11 | SNAPSHOT | USE |
| 1:12 | SNAPSHOT | USE |
| 1:13 | SNAPSHOT | UNUSED |
| ... | ... | ... |
| 1:30 | DATA | USE |
| 1:32 | JOURNAL DATA | USE |

FIG.10D

| # | COPY SOURCE APPARATUS IDENTIFIER | COPY SOURCE VOL IDENTIFIER | COPY DESTINATION APPARATUS IDENTIFIER | COPY DESTINATION VOL IDENTIFIER | TYPE | JNLVOL IDENTIFIER | COPY GROUP IDENTIFIER |
|---|---|---|---|---|---|---|---|
| 1 | 0001 | 1:02 | 0002 | 2:02 | RC | | |
| 2 | 0001 | 1:03 | 0002 | 3:03 | RC | | |
| 3 | 0001 | 1:04 | 0002 | 2:04 | RC | | |
| 4 | 0001 | 1:04 | 0003 | 3:04 | JC | 3:05 | |
| 5 | 0001 | 1:06 | | | | 1:08 | |
| 6 | 0001 | 1:20 | 0002 | 2:20 | RC | | 1 |
| 7 | 0001 | 1:21 | 0002 | 2:21 | RC | | 1 |
| 8 | 0003 | 3:30 | 0001 | 1:30 | RC | | |
| 9 | 0003 | 3:31 | 0001 | 1:31 | JC | 1:32 | |

FIG.10E

| VOL IDENTIFIER | WRITE | | READ | | TRANSMISSION FLAG |
|---|---|---|---|---|---|
| | ADDRESS | TIME STAMP | ADDRESS | TIME STAMP | |
| 1:05 | | 09:52:30 | | 09:50:30 | NOT REQUIRED |
| 1:08 | | 09:40:00 | | 07:58:00 | |
| 1:32 | | 09:50:00 | | 09:30:00 | |

Columns: 1041, 1042, 1043, 1044, 1045, 1046

FIG.10F

| DATA VOL | SNAPSHOT | |
|---|---|---|
| | SNAPSHOT VOL | TIME INSTANT |
| 1:06 | 1:09 | 2005/10/10 07:00:00 |
| | 1:10 | 2005/10/10 08:00:00 |
| 1:30 | 1:11 | 2006/03/03 06:00:00 |
| | 1:12 | 2006/03/10 06:00:00 |

Columns: 1051, 1052, 1053

FIG.10G

| VOL IDENTIFIER | WRITE | | READ | | TRANSMISSION FLAG |
|---|---|---|---|---|---|
| | ADDRESS | TIME STAMP | ADDRESS | TIME STAMP | |
| 3:05 | | 09:49:30 | | 09:48:30 | 0 |
| 3:12 | | 09:40:00 | | 09:40:00 | 1 |
| 3:13 | | 09:45:00 | | 09:45:30 | 0 |

FIG.10H

| # | TIME STAMP | SEGMENTING IDENTIFIER | ADDRESS | COPY SOURCE VOL IDENTIFIER | COPY DESTINATION VOL IDENTIFIER | PRIORITY FLAG |
|---|---|---|---|---|---|---|
| 1 | 09:49:20 | | | 1:03 | 3:03 | 1 |
| 2 | 09:49:40 | | | 1:03 | 3:03 | 1 |
| 3 | 09:50:00 | A001 | | 1:03 | 3:03 | 1 |
| 4 | 09:49:15 | | | 1:02 | 2:02 | |
| 5 | 09:49:25 | B001 | | 1:02 | 2:02 | |
| 6 | 09:50:10 | | | 1:04 | 2:04 | |
| 7 | 09:50:20 | | | 1:03 | 3:03 | |
| 8 | 09:50:30 | C001 | | 1:04 | 2:04 | |
| 9 | 09:50:40 | | | 1:03 | 3:03 | |
| 10 | 09:51:00 | A001 | | 1:03 | 3:03 | |
| 11 | 09:50:10 | | | 1:04 | 3:04 | |
| 12 | 09:50:30 | C001 | | 1:04 | 3:04 | |
| 13 | 09:51:10 | | | 1:04 | 2:04 | |
| 14 | 09:51:15 | | | 1:02 | 2:02 | |
| 15 | 09:51:20 | | | 1:03 | 3:03 | |
| 16 | 09:51:25 | B001 | | 1:02 | 2:02 | |
| 17 | 09:51:30 | C001 | | 1:04 | 2:04 | |
| 18 | 09:51:40 | | | 1:03 | 3:03 | |
| 19 | 09:52:00 | A001 | | 1:03 | 3:03 | |
| 20 | 09:52:10 | | | 1:04 | 2:04 | |
| 21 | 09:52:20 | | | 1:03 | 3:03 | |
| 22 | 09:52:30 | C001 | | 1:04 | 2:04 | |

FIG.22

| 2201 | STORAGE APPARATUS | 0001 |
|---|---|---|
| 2202 | DATA | DB-A  DB-B |
| 2203 | EXECUTION STARTING TIME INSTANT | 00:00:00 |
| 2204 | EXECUTION INTERVAL | 24:00:00 |
| 2205 | SUBJECT JOB | JOB1 |
| 2206 | DATA SAVING UPPER LIMIT TIME | 00:01:00 |

DATA TRANSFER METHOD AND INFORMATION PROCESSING APPARATUS

CROSS-REFERENCE TO RELATED APPLICATION

This application relates to and claims priority from Japanese Patent Application No. 2006-112892, filed on Apr. 17, 2006, the entire disclosure of which is incorporated herein by reference.

BACKGROUND OF THE INVENTION

The present invention is related to a technique for transferring data from a certain storage apparatus to the storage apparatus 102 installed at a remote site.

Disaster recovery technical ideas have been prepared for such a case that failures happen to occur in a storage apparatus connected to a host apparatus due to disaster and the like in such a way that while another storage apparatus is installed at a remote place, data are saved to this storage apparatus installed at the remote place. In this case, the storage apparatus connected to the host apparatus will be referred to as a "main storage apparatus", whereas the storage apparatus arranged at the remote place with respect to the "main storage apparatus" will be referred to as a "sub-storage apparatus" hereinafter. Technical ideas have been proposed in a system equipped with a main storage apparatus and a sub-storage apparatus, by which data is transferred from the main storage apparatus to the sub-storage apparatus in either a synchronous manner or an asynchronous manner (refer to, for example, JPA-2005-222110).

In the case that the data is transmitted from the main storage apparatus to the sub-storage apparatus in the synchronous manner, the data writing operations with respect to both the main storage apparatus and the sub-storage apparatus are accomplished in response to a write request issued from the host apparatus, and thereafter, a response is returned to the host apparatus. On the other hand, in the case that the data is transmitted from the main storage apparatus to the sub-storage apparatus in the asynchronous manner, before the data is written into the sub-storage apparatus, a response is returned to the host apparatus. Thereafter the data is transmitted from the main storage apparatus to the sub-storage apparatus so as to be written into the sub-storage apparatus.

SUMMARY OF THE INVENTION

As previously explained, in the case of the synchronous manner, it is possible to guarantee that the same data as that of the main storage apparatus has been stored in the sub-storage apparatus. However, if the distance between the main storage apparatus and the sub-storage apparatus is prolonged, then a lengthy time is necessarily required for transferring the data to the sub-storage apparatus, so that business executed in the host apparatus may be troubled. On the other hand, in the case of the asynchronous manner, even when the distance between the main storage apparatus and the sub-storage apparatus is prolonged, there is no possibility that the business executed in the host apparatus is troubled. However, the following problem may occur. That is, the same data has not been stored between the main storage apparatus and the sub-storage apparatus at a certain time instant. In this case, the main storage apparatus is brought into a shutdown status due to disaster, and even if the sub-storage apparatus tries to restart the business thereof, there are some cases that the data which might already be written thereinto is not stored in the sub-storage apparatus. As a result, there is such a problem that a lengthy time is required in order to restart the business in the sub-storage apparatus. Similarly, also in such a case that the data stored in the sub-storage apparatus is restored to the main storage apparatus, there are some cases that the main storage apparatus cannot be perfectly restored to the status thereof before the failure occurs. As a result, there is another problem that a lengthy time is required in order to restart the business in the main storage apparatus.

In accordance with a data transfer method and an information processing apparatus of the present invention, a host apparatus attaches a segmenting identifier to a write request and transmits the resulting write request to a storage apparatus corresponding to a storage system, while the segmenting identifier indicates such a segment having a meaning in a business field when data is written. The storage apparatus manages a data amount for every segmenting identifier, and when a request is received from the host apparatus, the storage apparatus transmits both the segmenting identifier and the data amount to the host apparatus. In the host apparatus, data which can be transferred within a predetermined time is acquired in the unit of the segmenting identifier based upon the transmitted data amount, and then, the acquired data amount is sent to the storage apparatus. The storage apparatus transmits data related to the transmitted segmenting identifier to a storage apparatus of a copy destination with a top priority.

Thus, the business can be restarted by utilizing the sub-storage apparatus as quickly as possible.

BRIEF DESCRIPTION OF THE DRAWINGS

FIG. 2 is a diagram for showing a copy control program, and information which is required to execute the copy control program.

FIG. 3A indicates an example of a dangerous information holding table.

FIG. 3B shows an example of a site list table.

FIG. 3C represents an example of a business data storage destination list table.

FIG. 3D denotes an example of a data saving destination list table.

FIG. 3E shows an example of an unsent data acquisition table.

FIG. 3F represents an example of an unsent data list table.

FIG. 3G indicates an example of a saving data list table.

FIG. 6A is a diagram for indicating an example of a data format.

FIG. 6B is a diagram for showing an example of a data format.

FIG. 10A is a diagram for showing an example of a control table.

FIG. 10B is a diagram for indicating an example of a copy control table.

FIG. 10C is a diagram for representing an example of a volume management table.

FIG. 10D is a diagram for indicating an example of a pair definition table.

FIG. 10E is a diagram for representing an example of a journal data management table.

FIG. 10F is a diagram for showing an example of a snapshot management table.

FIG. 10G is a diagram for indicating an example of a pair definition table.

FIG. 10H is a diagram for representing an example of a journal data management table.

FIG. 22 is a diagram for showing an example of a copy management table.

DETAILED DESCRIPTION OF THE EMBODIMENTS

Figure 1:
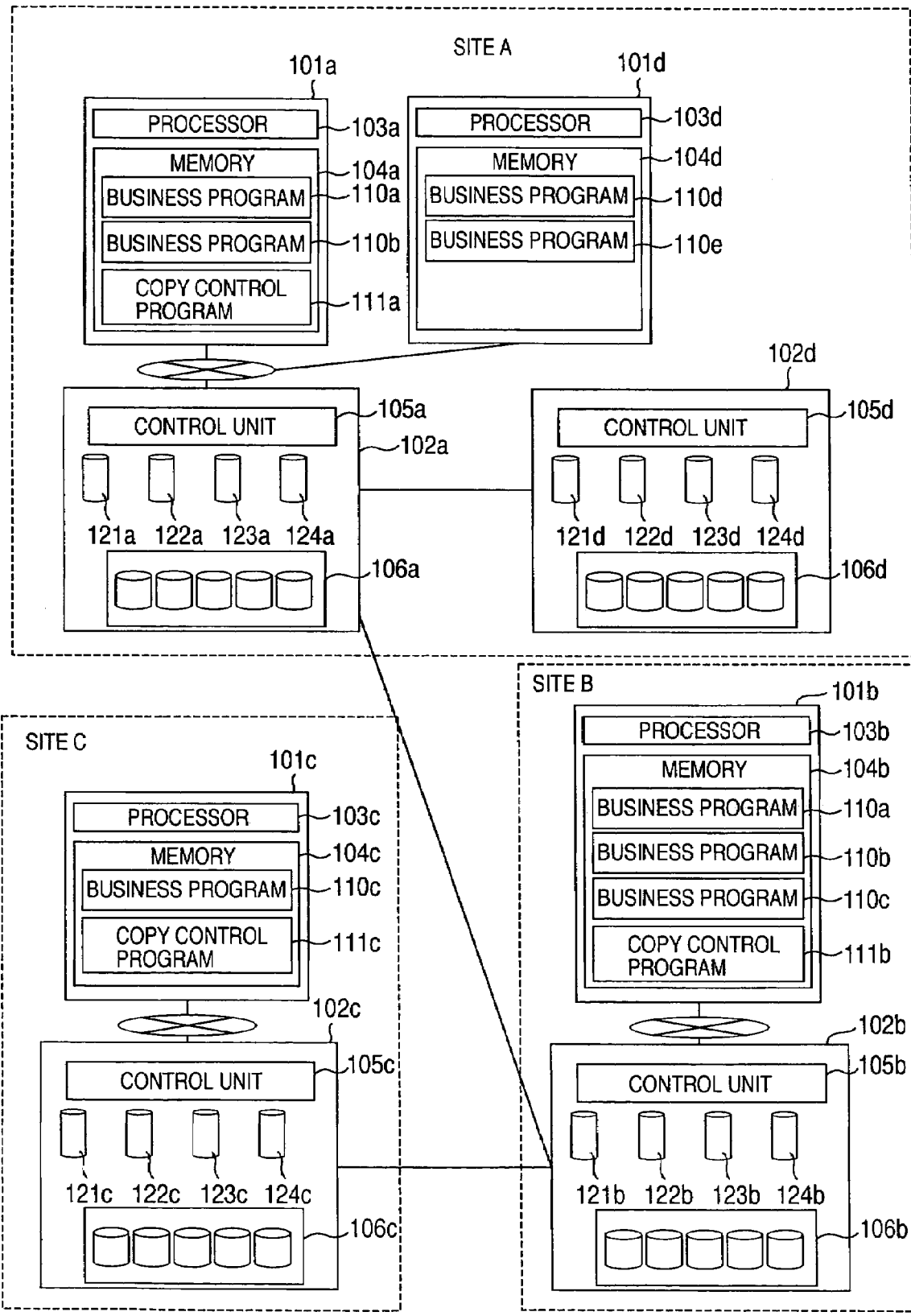
FIG. 1 is a diagram for schematically indicating an example as to an arrangement of an information processing system according to an embodiment of the present invention.

FIG. 1 shows an arrangement of an information processing system according to an embodiment of the present invention. The information processing system contains hosts 101a to 101d, and storage apparatus 102a to 102d. The hosts 101a and 101d, the storage apparatus 102a, and the host 101b have been connected via a network to the storage apparatus 102b, the host 101c, and the storage apparatus 102a. Also, the storage apparatus 102a has been connected via the network to the storage apparatus 102d. Furthermore, the storage apparatus 102a and the storage apparatus 102c have been connected via the network to the storage apparatus 102b, respectively. In this case, assuming now that the hosts 101a and 101d, and the storage apparatus 102a and 102d are a site A; the host 101b and the storage apparatus 102b are a site B; and the host 101c and the storage apparatus 102c are a site C; the site A, the site B, and the site C. have been arranged at geographically remote places. The hosts 101a, 101d, 101c of the sites A and C correspond to a main site which perform normal business. The host 101c of the site B corresponds to such a sub-site that duplicates (copies) of data of the sites A and C as backup data are held, and when a failure occurs, the host 101b performs business instead of the site A and the site C.

The host 101 contains a processor 103 and a memory 104. A business program 110 has been stored in a main memory 104d of the host 101d. Also, the business program 110 and a copy control program 111 have been stored in memories 104a to 104c of the hosts 101a to 101c. The processor 103 reads out the business program 110 and the copy control program 111 stored in the memory 104 so as to execute these programs 110 and 111. Since the business program 110 is executed, write data, a write command, and a read command are issued from the processor 103. When write data which constitutes an end of business is transferred, an identifier (will be referred to as "segmenting identifier" hereinafter) which has a meaning of an end is added to a write command. A business end implies a unit of such a repetition in the case that, for example, the business program 110 repeatedly executes a series of process operations. Process operations as to the copy control program 111 will be explained later.

It should be noted that while the business programs 110 of the hosts 101a, 101d, 101c have been stored in the memory 104b of the host 101b, in such a case that both the site A and the site C cannot execute the business due to a failure, the site B can restart the business.

The storage apparatus 102 contains a control unit 105 and a plurality of storage media 106. The storage media 106 correspond to, for instance, disk apparatus semiconductor memories, and the like. Also, the storage apparatus 102 contains a control command volume 121, a data volume 122, a journal volume 123, and snapshot volume 124. Each of the volumes corresponds to a storage area (volume) defined by logically segmenting a storage area of one, or plural pieces of the storage media 106. This volume is provided by the control unit 105. It should also be noted that although each of the storage apparatus 102 shown in FIG. 1 owns one volume, the respective storage apparatus 102 may be alternatively set to have a plurality of volumes. The host 101 writes, or reads data with respect to the control command volume 121 and the data volume 122. It should also be noted that the data stored in the control command volume 121 contain such data as commands and various sorts of parameters (will be explained later). Also, a single business program may be allocated in such a manner that data may be written, or read with respect to a plurality of data volumes 122.

The data volume 122 and the journal volume 123 which are owned by the storage apparatus of the site A and the site C constitute a pair of the data volume 122 and the journal volume 123 which are owned by the storage apparatus of the site B. Either data or journal data stored in the data volumes 122, or the journal volumes of the sites A and C are transferred to the data volume 122 and the journal volume 123 of the side B in an asynchronous manner. Furthermore, even between the storage apparatus 102a and the storage apparatus 102d of the site A, both the data volumes 122 and the journal volumes 123 have constituted a pair, if necessary, and data have been transferred in an asynchronous manner.

It should also be noted that FIG. 1 indicates such a case that the storage apparatus 102d is located within the site A. Alternatively, the storage apparatus 102d may be located in another site. In this alternative case, the host 101a may handle the storage apparatus 102d in a similar manner to the storage apparatus 102b. Also, the data stored in the storage apparatus 102a may be alternatively arranged as follows: That is, the same data may be copied to a plurality of storage apparatus in such a manner that this data may be copied (backed up) to the storage apparatus 102d and 102b.

Now, process operations executed by the respective hosts 101a to 101d and the respective storage apparatus 102a to 102d will be explained in detail.

FIG. 2 shows a structure of the copy control program 111 and a table into which information required for processing operations of the copy control program 111 has been stored. This copy control program 111 and the necessary table have been stored in the memory 104 of the host 101. It should also be understood that although the copy control program 111 is read so as to be executed by the processor 103, this copy control program 111 may be arranged as hardware in the processor 103, or may be alternatively constructed as separate hardware.

The copy control program 111 contains a data save determining portion 201, an unsent data acquiring portion 202, a saving data determining portion 203, and a saving instruction executing portion 204. Also, in order to execute the copy control program 111, there are a dangerous information holding table 211, a site list table 212, a business data storage destination list table 213, a data saving destination list table 214, an unsent data acquisition table 215, an unsent data list table 216, and a saved data list table 217.

FIG. 3A to FIG. 3G show the respective tables. In this case, although the tables held by the host 101a are indicated, other hosts similarly own these tables as items.

FIG. 3A shows the dangerous information holding table 211. This table 211 corresponds to such a table that when the host 101 receives disaster prediction information (will be explained later), this disaster prediction information is registered. Both an occurrence prediction time instant 301 of disaster, and a suffered disaster scale 302 are set to the dangerous information holding table 211.

FIG. 3B indicates the site list table 212. In this site list table 212, an apparatus identifier 311 of the storage apparatus 102 arranged in the same area as the host 101 is set; a disaster withstandable value (disaster withstandable permission value) 312 of each of the storage apparatus 102 is set; and a value (disaster withstandable upper limit value) 313 for predicting that the storage apparatus 102 is completely stopped is set. In this case, apparatus identifiers, disaster withstandable permission values, and disaster withstandable upper limit values as to the storages apparatus 102a (apparatus identifier 0001), and the storage apparatus (apparatus identifier 0002) arranged in the same area as the host 101a of the site A have been set to this site list tables 212 by a manager.

FIG. 3C shows the business data storage destination list table 213. This is such a table 213. This is such a table that business programs of the respective hosts arranged in the same area and data storage destinations of the business programs are set. A business program name 321, a data name 322, an apparatus identifier 323 of the storage apparatus 102 functioning as a copy source, and a volume identifier (copy source vol identifier) 324 of the copy source are set by the manager in this table 213. In this case, the business programs A and B correspond to such business programs which are executed by the host 102a, whereas the business programs C and D correspond to such business programs which are executed by the host 102b.

FIG. 3D shows the data saving destination list table 214. This is such a table that pair relationships among the volumes where the data of the business programs shown in FIG. 3C are stored are set. That is, a copy source apparatus identifier 331, a copy source vol identifier 332, a copy destination apparatus identifier 332, a copy destination vol identifier 334, a copy type 335, a priority degree 336, and a data transfer speed 337 are set to this data saving destination list table 214. Alternatively, the copy source apparatus identifier 331, the copy source vol identifier 332, the copy destination apparatus identifier 332, the copy destination vol identifier 334, and the copy type 335 may be set by the manager, and alternatively may be read out from a pair definition table of the storage apparatus 102 (will be explained later) so as to be set in this list table 214. The priority degree 336 corresponds to a priority degree in the case that data is saved. The manger sets a priority degree based upon a content of data and a copy type. In this case, the list table 214 shows such a case that the smaller than numeral value becomes, the higher the priority degree becomes. The data transfer speed 337 has been set for every pair. This reason is given as follows: That is, while data is transferred between storage apparatus, the data of all of the volumes utilize the same ports, or the different ports, so that a data transfer speed may be registered for every volume. As to this data transfer speed 328, a speed value obtained in a designing operation may be registered by the manger, and alternatively, a speed value which is measured in an actual data transfer operation in the storage apparatus 102 may be collected to be stored in this list table 214.

FIG. 3E represents the unsent data acquisition table 215. This acquisition table 215 corresponds to such information used to acquire information (unsent data information) related to unsent data from the storage apparatus 102 (will be explained later), and contains a copy source apparatus identifier 341, a copy source vol identifier 342, a copy source apparatus identifier 343, and a copy destination vol identifier 344. An acquisition flag 345 indicates as to whether or not unsent data information has been acquired from the storage apparatus 102. "0" of the acquisition flag 345 indicates such a condition that the unsent data information has not yet been acquired, whereas "1" of the acquisition flag 345 indicates such a condition that the unsent data information has not been acquired.

FIG. 3F represents the unsent data list table 216. Based upon the unsent data acquisition information of FIG. 3E, unsent data information acquired from the storage apparatus has been registered in this unsent data list table 216. The unsent data information contains an segmenting identifier 351, a time stamp 352, a copy source apparatus identifier 353, a copy source vol identifier 354, a copy destination apparatus identifier 355, a copy destination vol identifier 356, and a data amount 357.

FIG. 3G indicates the saving data list table 217. This list table 217 corresponds to such a table which is produced for every storage apparatus of a copy source, and to which information used to save data in the storage apparatus 102 is set. An occurrence prediction time instant 361, a disaster scale 362, a danger arrival grace time period 363, a write refusal flag 364, and saving data information 365 have been registered in each of the saved data list tables 217. The saving data information 365 corresponds to such an information for specifying data which is saved, and also, corresponds to such unsent transmission data information which contains an segmenting identifier, a time stamp, a copy source apparatus identifier, a copy source vol identifier, a copy destination apparatus identifier, and a copy destination vol identifier. Also, a status 366 is set to the saving data information 365, while the status 366 sets as to whether or not this unsent data information has been transmitted to the storage apparatus 102.

As apparent from FIG. 3A to FIG. 3G, in the above-explained information processing system, since the host 101d does not own the copy control program 111, the host 102a is so arranged that this host 102a saves the data of the host 101d. Alternatively, the host 101d may have the copy control program 111.

While such a case that the host 101a receives disaster prediction information is exemplified, a description is made of process operations of the copy control program 111. The disaster prediction information explained in this example is related to an earthquake, and contains information as to both an earth tremor arrival time instant and a magnitude of the earth tremor. Also, as to this disaster prediction information, there is an apparatus which generates disaster prediction information in each of predetermined areas, and the host 101 located in this area receives the disaster prediction information. As a consequence, in the case that the sites A, B, C are different areas, there are some cases that the disaster prediction information is transmitted only from the site A. Also, in the case that broad disaster occurs, disaster prediction information is transmitted to the sites A, B, C. The contents of this disaster prediction information are different from each other, or the disaster prediction information is received at different timing. The disaster prediction information is transmitted via either a wireless network or a wired network. Each of the hosts contains a receive apparatus which receives the disaster prediction information transmitted via either the wireless network or the wired network, and the copy control program 111 is executed by receiving the disaster prediction information.

Alternatively, a disaster prediction detecting apparatus may be owned by at least one host 101 of each of the areas. It should be understood that in the case of, for example, an earthquake, this disaster prediction detecting apparatus may acquire a disaster scale and a disaster prediction time instant by detecting a P wave, by detecting an electromagnetic wave generated before the earthquake occurs, and by measuring an atmospheric ion. It should also be noted that as to the disaster prediction, disaster other than an earthquake may be alternatively detected.

Figure 4:
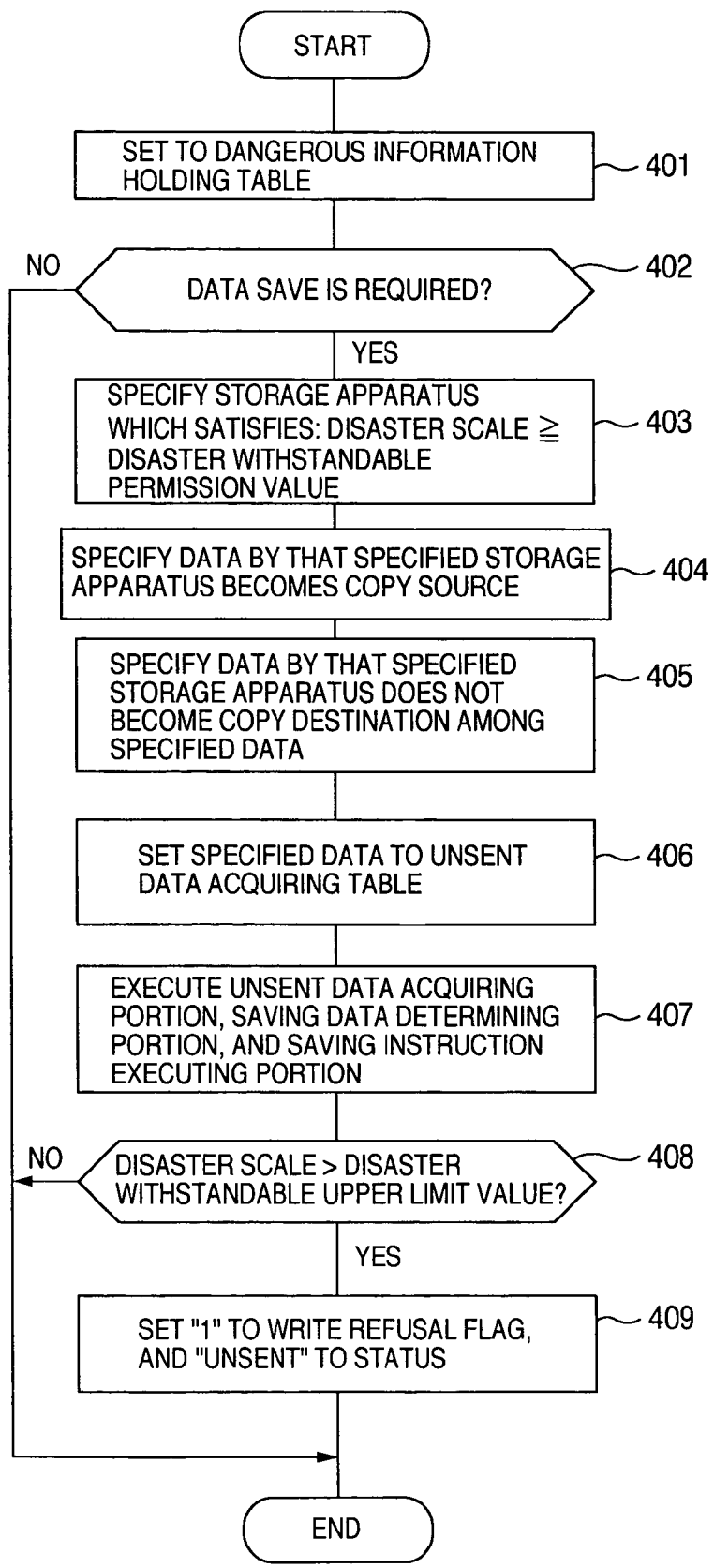
FIG. 4 is a flow chart for indicating process operations of a copy control program.

FIG. 4 is a flow chart for explaining process operations of the copy control program 111.

The copy control program 111 sets received disaster prediction information to the dangerous information holding table 211 (step 401). Concrete speaking, in the case that the host 101*a* receives the disaster prediction information, an earth tremor arrival time instant contained in the disaster prediction information is registered in the occurrence prediction time instant 301, and earth tremor magnitude information contained in the disaster prediction information is registered to the suffered disaster scale 302.

Next, the copy control program 111 judges as to whether or not data must be saved (step 402). This judgement is carried out as follows: That is, a value of the suffered disaster scale 302 of the dangerous information holding table 211 is compared with the disaster withstandable permission value 312 of the site list table 212. If the value of the suffered disaster scale 302 is smaller than the disaster withstandable permission value 312 ("NO" in step 402), then the copy control program 111 judges that the data is not required to be saved, and accomplishes the process operation. On the other hand, in the case that there is such the storage apparatus 102 that a value of a suffered disaster scale 302 is larger than, or equal to a disaster withstandable permission value 312, the copy control program 111 judges that the data must be saved ("YES" in step 402), and specifies the storage apparatus whose suffered disaster value becomes larger than, or equal to the disaster withstandable permission value (Step 403). Next, the specified storage apparatus specifies data corresponding to the storage apparatus of the copy source (step 404). Furthermore, the specified storage apparatus specifies such a data of a not-specified storage apparatus (step 405), and sets this specified data to the unsent data acquisition table 214 (step 406). In the step 403, the storage apparatus 102*a* and 102*d* are specified based upon FIG. 3A and FIG. 3B (apparatus identifiers of storage apparatus 102*a* and 102*d* are 0001 and 0002, respectively). Then, in the step 404, data (DB-A to DB-D) are specified in which the storage apparatus 102*a* and 102*d* are the storage apparatus of the copy source. Thereafter, in the step 405, data (DB-C, DB-D) are removed in which the storage apparatus 102*a* and 102*d* correspond to the storage apparatus of the copy destination. As a result, the data of DB-A and DB-B are set to the unsent transmission data acquisition table 215. It should also be noted that the data are set to the unsent data acquisition table 215 in accordance with the priority orders set to the data saving destination list table 214. Next, "0" is set to the unsent data list table 215 (step 406) so as to execute the unsent data acquiring portion 202, the saving data determining portion 203, and the saving instruction executing portion 204 (step 407). As a result, the process operations as to the unsent data acquiring portion 202, the saving data determining portion 203, and the saving instruction executing portion 204 are executed in parallel to the present process operation. Next, a value of the suffered disaster scale 302 of the dangerous information holding table 211 is compared with the disaster withstandable upper limit value 313 of the site list table 212 (step 408). If the value of the suffered disaster scale 302 is larger than, or equal to the disaster withstandable upper limit value 313, then "1" is set to the write refusal flag of the saving data list table 217 of this storage apparatus, and "unsent" is set to the status (step 409), and the process operation is ended. In the step 408, when a suffered disaster scale is smaller than the disaster withstandable upper limit value with respect to all of the storage apparatus, the process operation is directly accomplished.

Figure 5:
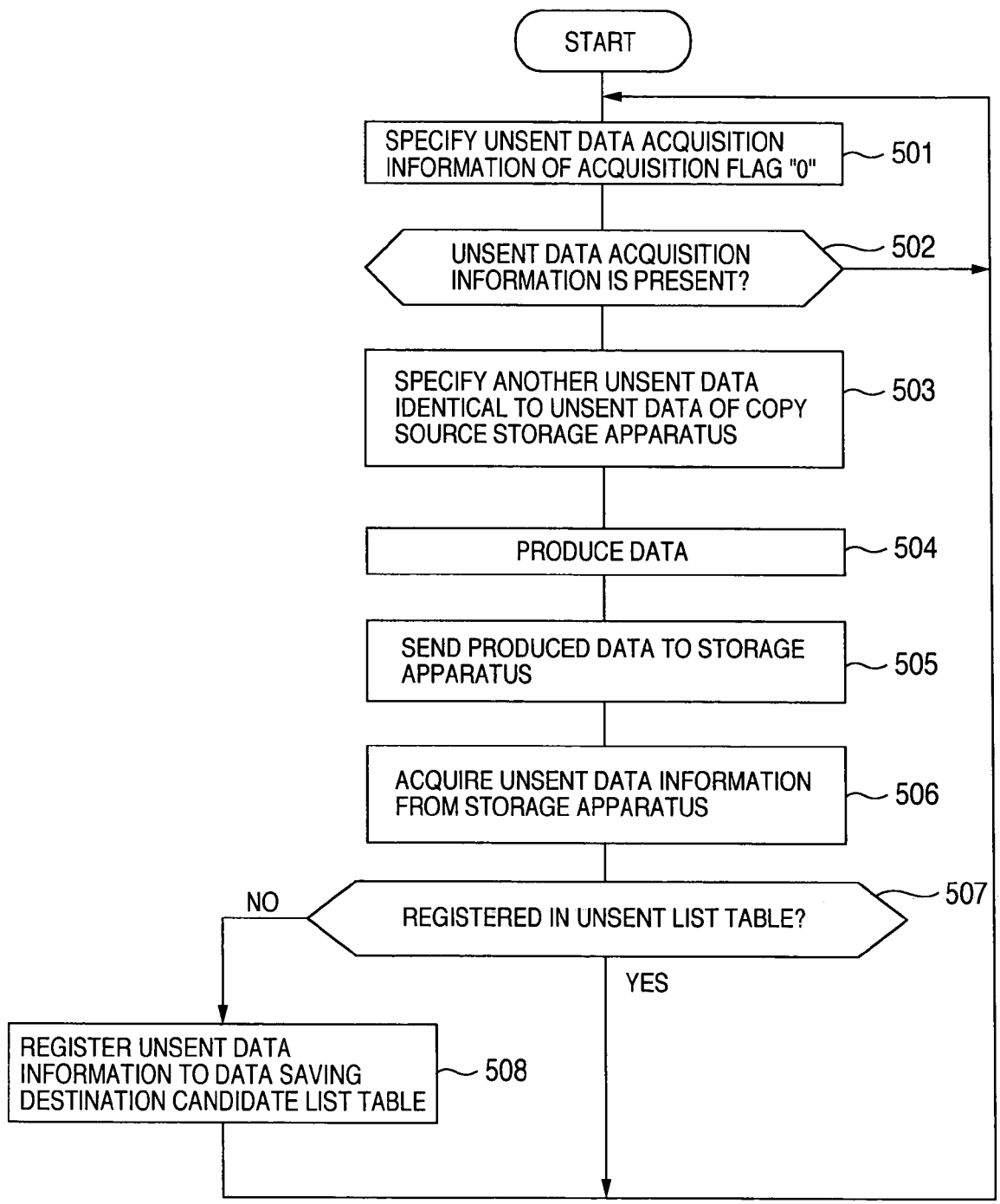
FIG. 5 is a flow chart for indicating process operations of an unsent data acquiring portion.

Next, process operations of the unsent data acquiring portion 202. FIG. 5 is a flow chart for indicating the process operations of the unsent data acquiring portion 202. First, unsent data acquisition information in which "0" has been set to the acquisition flag of the unsent data acquiring portion 202 is specified (step 501). In this example, the unsent data acquisition information of the number 1 is selected. Since the unsent data acquisition information is specified ("YES" in step 502), such an unsent data acquisition information whose copy source apparatus identifier is the same as that contained in the selected unsent data acquisition information, and whose acquisition flag is "0" is specified (step 503). Based upon the specified unsent data acquisition information, data is produced which is sent to the storage apparatus 102 (step 504). In this case, such an unsent data acquisition information of the number 2 is specified which owns a copy source apparatus identifier equal to the copy source apparatus identifier (0001) of the sequence number 1 and selected in the step 501, and whose acquisition flag is "0." Then, in a step 504, such a data shown in FIG. 6A is produced. FIG. 6A shows a structure of data which is sent to the storage apparatus 102, and this data contains a command which executes an unsent transmission data information acquisition program 918 for acquiring unsent data information (will be explained later); a copy source apparatus identifier which specifies the unsent data information to be acquired; a copy source vol identifier a copy destination apparatus identifier; and a copy destination vol identifier. Next, the produced data is sent to the storage apparatus 102 (step 505). This produced data is stored in the control command volume 121 of the storage apparatus 102. In this storage apparatus 102, the unsent data information acquisition program 918 is executed based upon a command contained in this data so as to acquire the unsent data information, and this acquired unsent data information is stored in the control command volume 121. The unsent data acquiring portion 202 reads out the unsent data information stored in the control command volume 121 (step 506). Next, the unsent data acquiring unit 202 judges as to whether or not the read unsent data information has been registered in the unsent data list table 216 (step 507). If the read unsent data information has already been registered, then the process operation is returned to the step 501. If the read unsent data information has not yet been registered, then this read unsent table information is registered in the unsent data list table 216 (step 508).

Figure 7:
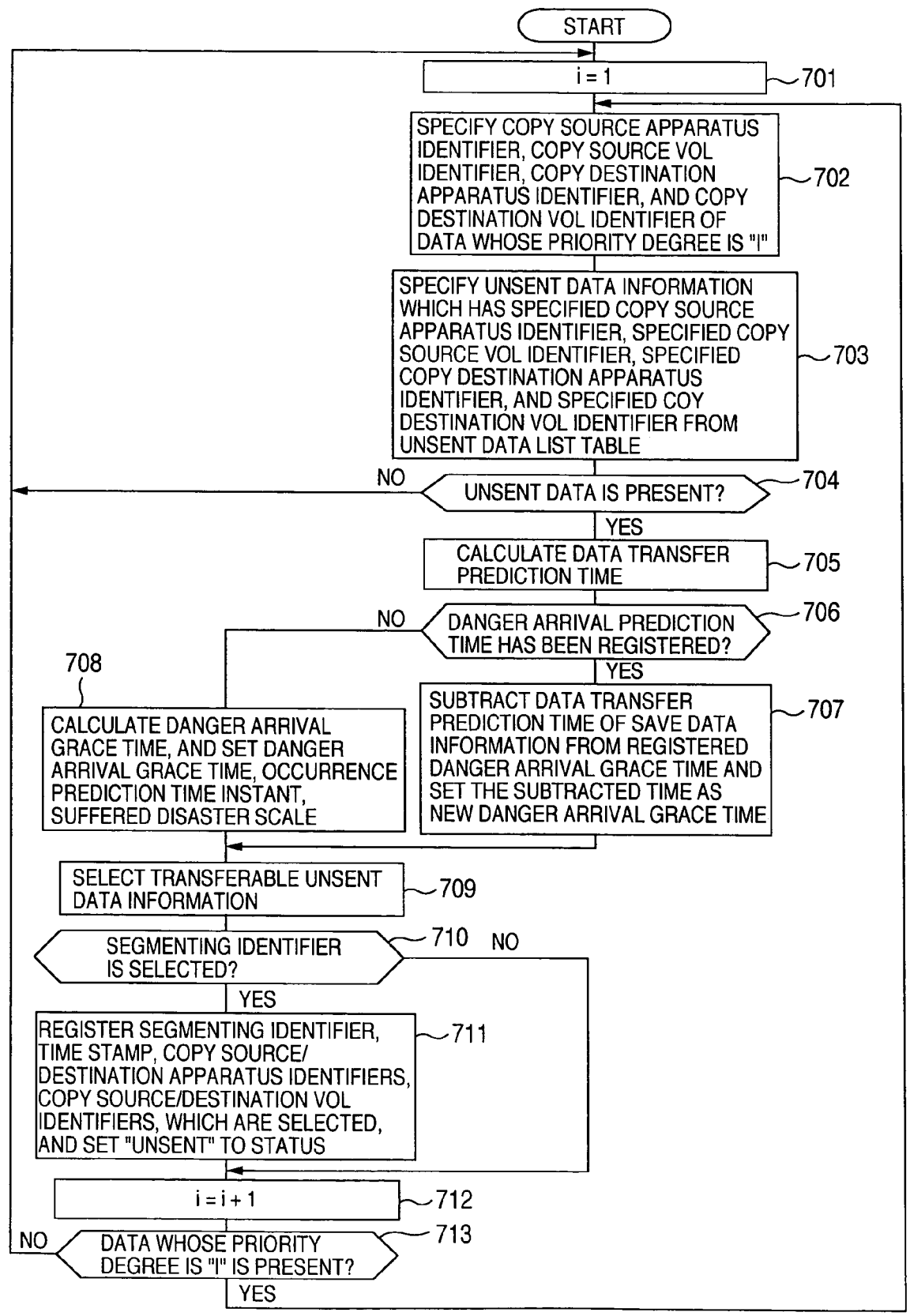
FIG. 7 is flow chart for describing process operations of a saving data determining portion.

Next, a description is made of processing operations of the saving data determining portion 203. FIG. 7 is a flow chart for explaining the process operations of the saving data determining portion 203.

First, i=1 is set (step 701). Next, in the data saving destination list table 213, a copy source apparatus identifier, a copy source vol identifier, a copy destination apparatus identifier, and a copy destination vol identifier are specified, the priority degree of which is "i" (step S702). Next, such an unset data information is specified from the unsent data list table 217, and own a copy source apparatus identifier, a copy source vol identifier, a copy destination apparatus identifier, and a copy destination vol identifier, which are identical to the specified copy source apparatus identifier, the specified copy source vol identifier, the specified copy destination apparatus identifier, and the specified copy destination vol identifier (step 703). For example, in the case that the priority degree is 1 (i=1), in FIG. 3, the number 1 of the data saving destination list table 213 is specified in the step 702, and the unsent data information of the numbers 1 to 3 in the unsent data list table 216 are specified in the step 703. Next, the saving data determining portion 203 judges as to whether or not unsent data information is present (step 704). When the unsent data information is present, a data transfer prediction time (data amount/data transfer speed) is calculated based upon a line speed and a data amount for every segmenting identifier (step 705). In this step 705, the numbers 1 to 3 are calculated as 2.5 seconds respectively. Next, the saving data determining portion 203 judges as to whether or not a danger arrival grace time has been set to the saving data list table 217 (step 706). In the case that the danger arrival grace time has not yet been registered in the saving data list table 217, a remaining time (namely, danger arrival grace time) up to a disaster occurrence prediction time instant is calculated based upon the occurrence prediction time instant 301 of the dangerous information holding table 211, and a present time instant measured by a clock of the host 101; and then, the danger arrival grace time calculated from the saving data list table 217, and both the occurrence prediction time instant and the suffered disaster scale registered in the dangerous information holding table 211 are set (step 708). In the case that the danger arrival grace time has already been registered in the saving data list table 217 ("YES" in step 706), such a time is defined as a new danger arrival grace time, which is obtained by subtracting the data transfer prediction time of the saving data information registered in the saving data list table 217 from the registered danger arrival grace time (step 707). The reason why the new danger arrival grace time is calculated will be explained later.

Then, based upon the calculated data transfer prediction time and the danger arrival grace time, the unsent data information which can be transferred within the danger arrival grace time is specified in this order of the small time stamps (namely, in order of old data) (step 709). For instance, in such a case that the danger arrival grace time is 4 seconds, the unsent data information of the sequence number 1 is specified. Also, in such a case that the danger arrival grace time is 10 seconds, the unsent data information of the sequence numbers 1 to 3 are specified. If the danger arrival grace time is 1 second, any of the unsent data information is not selected.

Next, the saving data determining portion 203 judges as to whether or not unsent data information is specified (step 710). If the unsent data information is specified, then the unsent data information is registered as saving data information 365 of the saving data list table 217, and "unsent" is set to the status (step 711). Next, i=i+1 is set (step 712), the saving data determining portion 203 judges as to whether or not such a data whose priority degree is "i" has been registered in the data saving destination list table 214 (step 713). If the above-described data has been registered in the list table 214, then the process operation is commenced from the step 702. If the above-explained data has not yet been registered, then the process operation is returned to the step 701 in which the same process operation is carried out from the priority order of 1. The reason why the same process operation is again executed from the priority order of 1 is given as follows: That is, the unsent data acquiring portion 202 sequentially acquires the unsent data information from the storage apparatus. As a consequence, even when the unsent data information is specified to be registered as the saving data information in the process operation shown in FIG. 7, thereafter, there are some cases that unsent data information is newly registered. As explained above, in order to judge as to whether or not the new unsent data information can be transferred, such a time is defined as a new danger arrival grace time, which is obtained by subtracting the data transfer time which has already been registered as the saving data information from the danger arrival grace time which has already been calculated in the step 707.

While the process operations as to the unsent data acquiring portion 202 and the saving data determining portion 203 have been explained, the above-explained process operations are repeatedly carried out until these process operations are accomplished by the saving instruction executing portion 204 (will be subsequently explained).

Figure 8:
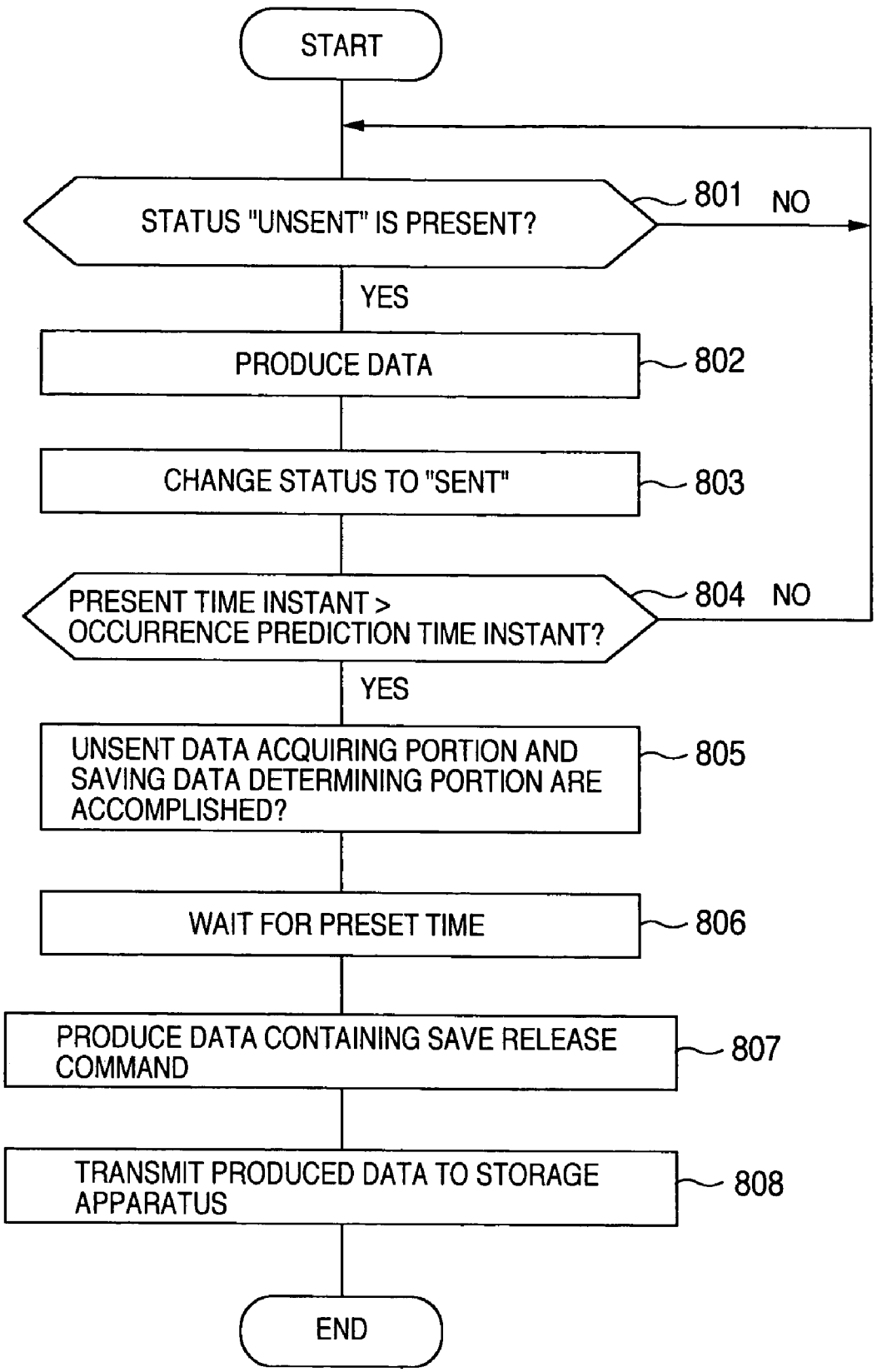
FIG. 8 is a flow chart for explaining process operations of a saving instruction executing portion.

Next, process operations of the saving instruction executing portion 205 will now be described. FIG. 8 is a flow chart for representing the process operations executed by the saving instruction executing portion 204.

First, while sequentially referring to the saving data list table 217, the saving instruction executing portion 205 judges as to whether or not the status 366 becomes "unsent" (step 801). Then, when the "unsent" status is present, data which is sent to the storage apparatus 102 is produced from the "unsent" data of this saving data list table 217 (step 802).

FIG. 6B shows an example of a data format. As commands, there are a register command, a data saving program execute command, and a transfer command. Also, as parameters of the register command, there are a write refusal flag, an occurrence prediction time instant, a suffered disaster scale, and a danger arrival grace time. As parameters of the data saving program execution command, there are an segmenting identifier, a copy source vol identifier, a copy destination vol identifier and a time stamp for every segmenting identifier. Also, as parameters of the transfer command, there are an apparatus identifier which specifies the storage apparatus 102 corresponding to a transfer destination, a register command, an occurrence prediction time instant, a suffered disaster scale, and a danger arrival grace time. The transfer command corresponds to such a command which, for example, is employed so as to transfer a parameter via the storage apparatus 102a to the storage apparatus 102b. To this end, a command (register command) which is executed in the storage apparatus 102 of a transfer destination is contained in combination with the transfer command. Both a command and a parameter as to "unsent" data are set, and "NULL" is set to other data. For instance, in such a case that "unsent" has been set as to a write prohibit flag of a saving data list table, only a register command and a write prohibit flag are set, whereas "NULL" is set to other data.

Next, the saving instruction executing portion 204 transmits the produced data as write data to the storage apparatus 102, and sets the status to "sent" (step 803). Next, the saving instruction executing portion 204 compares a present time instant with the occurrence prediction time instant (step 804). When the present time instant has not yet become the occurrence prediction time instant, the process operation is returned to the step 801. When the present time instant becomes longer than, or equal to the occurrence prediction time instant, the saving instruction executing portion 204 accomplishes the process operations of the unsent data acquiring portion 202 and the saving data determining portion 203, waits for a predetermined time (step 806), sends data which is used to return the storage apparatus 102 to the normal status to the storage apparatus 102 (step 807), and then, accomplishes the process operation. In order to return the storage apparatus 102 to the normal status, a write refusal flag, an occurrence prediction time instant, a suffered disaster scale, a danger arrival grace time, and priority control information may be deleted, which are managed by the storage apparatus. To this end, as represented in FIG. 6B, a delete command, and data are sent to the storage apparatus, while this data contains a write refusal flag, an occurrence prediction time instant, a suffered disaster scale, a danger arrival grace time, and priority control information, which are parameters for designating deletion subjects.

As previously explained, the copy control program 111 specifies the data which should be saved based upon the remaining time until the disaster occurs, and sets the write refusal to the storage apparatus. It should also be noted that as explained in this example, the commands for causing the storage apparatus 102 to execute the process operations are converted into the data formats. Alternatively, while the host 101 may be connected to the storage apparatus 102 by employing a leased network, the commands may be directly sent to the control unit 105 of the copy control program 111. Also, while the functions of the copy control program 111 may be provided in the storage apparatus 102, the system may be alternatively arranged in such a manner that process operations are carried out within the storage apparatus 102.

Figure 9:
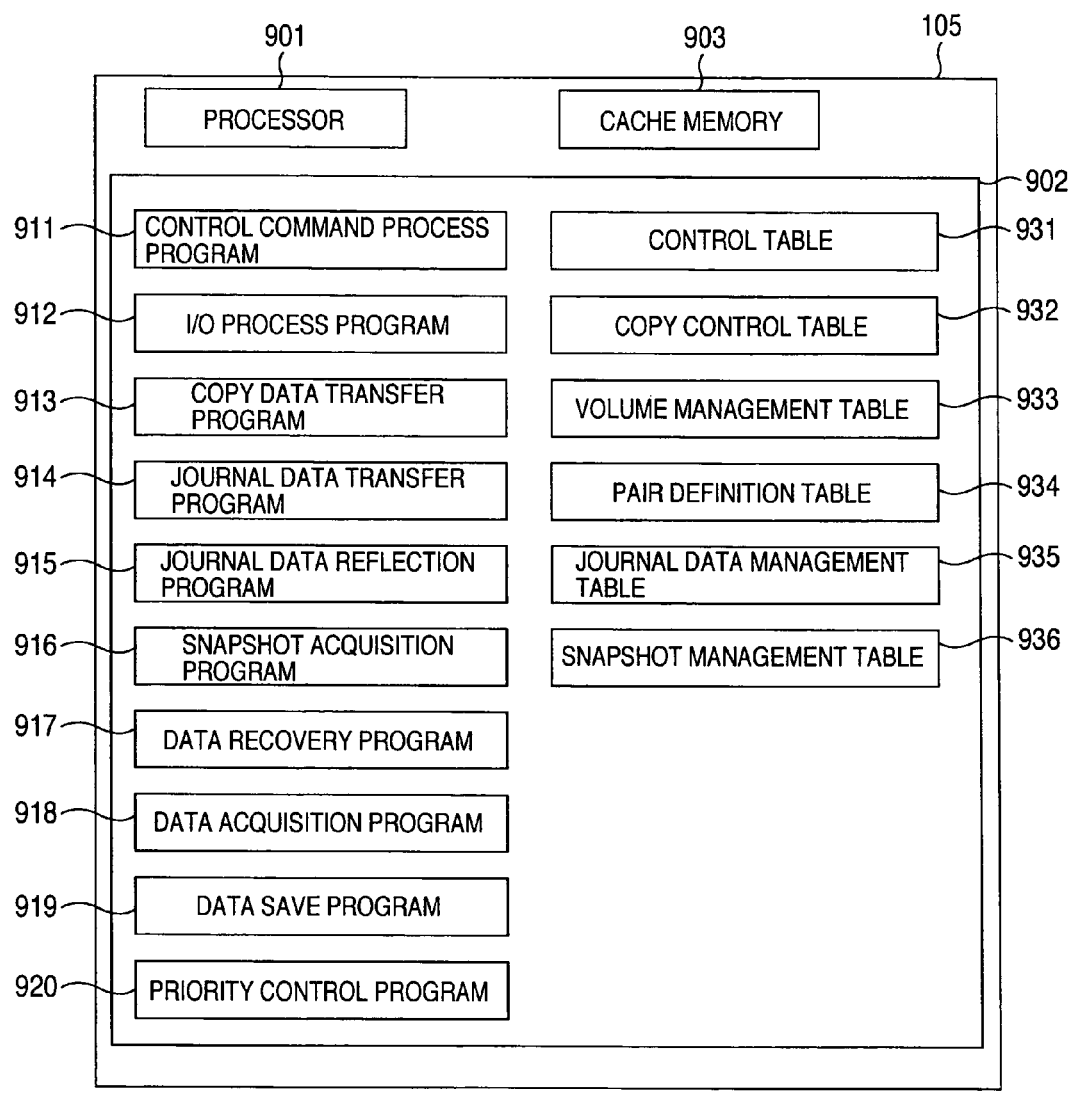
FIG. 9 is a diagram for indicating an arrangement of a control unit of the storage apparatus 102.

Next, process operations of the storage apparatus 102 will now be explained. FIG. 9 indicates an internal structure of the control unit 105 of the storage apparatus 102. The control unit 105 contains a processor 901 which executes process operations, a shared memory 902 to which various sorts of programs and data required to execute the programs are stored, and a cache memory 903 into which either write data or read data is stored. In the shared memory 902, a control command process program 911, an I/O process program 912, a copy data transmission program 913, a journal data transmission program 914, a journal data reflection program 915, a snapshot acquisition program 916, a data recovery program 917, an unsent data information acquisition program 918, an unsent data saving program 919, a priority control program 920, a control table 931, a copy control table 932, a volume management table 933, a pair definition table 934, a journal data management table 935, and a snapshot management table 936 have been stored. It should also be understood that the above-explained respective programs are read by the processor 901 to be executed, and alternatively, these programs may be arranged in the form of hardware within the processor 901, or in the form of separate sets of hardware, as a control command processing unit, an I/O processing unit, a copy data transferring unit, a journal data transmitting unit, a data reflecting unit, a snapshot acquiring unit, a data recovering unit, a saving data acquiring unit, and a data saving unit.

Also, in this example, such an initial condition is employed by that the control units 105 of all of the storage apparatus 102 have the same arrangements. Alternatively, the arrangements of the control units 105 may be changed, if necessary. For example, in such a case that journal data is not copied, the journal data transmission program 914 and the journal data reflection program 915 may not be employed. Also, in the case that journal data is copied, the journal data reflection program 915 is not required in a control unit of the storage apparatus 102 which transmits the journal data, and the journal data transmission program 914 is not required in a control unit of the storage apparatus 102 which receives the transmission data, which may be apparent from the below-mentioned explanation. As to tables, if such tables required for a program are provided, then the control unit 105 may be alternatively arranged, which will be apparent from the below-mentioned explanation.

FIG. 10A to FIG. 10H indicate information stored and managed in a shared memory of the storage apparatus 102. In this example, while the storage apparatus 102a is exemplified, the information will now be explained with employment of FIG. 10A to FIG. 10F.

FIG. 10A shows the control table 931. In this control table 931, a write refusal flag 1001, disaster information 1002, priority control information 1003, snapshot control information 1004, and data recovery control information 1005 are set. In the case that "0" has been set to the write refusal flag 1001, data is written in a storage area with respect to a data write request sent from either the host 101 or the storage apparatus 102, whereas data is read out from the storage area with respect to a read request sent from the host. In the case that "1" has been set to the write refusal flag 1001, an "error" is returned, and data is not written with respect to a data write request sent from either the host 101 or the storage apparatus 102, whereas data is read out from the storage area with respect to a read request sent from the host, and the read data is sent to a request source. The disaster information 1002 can set disaster information of the own storage apparatus and disaster information as to another storage apparatus. As the disaster information, an apparatus identifier of a storage, a disaster occurrence prediction time instant, a suffered disaster scale, and a danger arrival grace time are set. In the priority control information 1003, a process operation (program) which has a primary priority is registered. In the snapshot control information 104, an identifier of a data volume which constitutes a subject of acquiring a snapshot, a starting time instant of a snapshot, and an interval for acquiring snapshots are registered. In this example, such a condition that snapshots are acquired has been set with respect to the data volumes. In the data recovery control information 1005, both a volume identifier which constitutes a data recovery subject, and information as to a time instant at which the data is wanted to be recovered are set.

FIG. 10B represents the copy control table 932. When data is produced which is transmitted to another storage apparatus, the following items are set to this copy control table 932. That is, a time stamp 1011, an segmenting identifier 1012, an address 1013 of a cache memory into which the data has been stored, a copy source vol identifier 1014, a copy destination vol identifier 1015, and a priority flag 1016 are set. Then, the data are transmitted in the order of smaller numbers (#). The time stamp 1011 is a time instant when write data is received by the storage apparatus 102. When an segmenting identifier has been added to a wrote command sent from the host 101, this attached segmenting identifier is set to the segmenting identifier 1012. While normally "0" has been set to the priority flag 1016, the priority flag 1016 is set in such a case that a data saving instruction is received from the host 101, and there is such a data which is sent with a top priority. It should be noted that data having numbers 1 to 10 and 13 to 22 have been arranged in the order of smaller time stamps. This reason is given as follows: That is, the numbers 1 to 10 and 13 to 22 correspond to data of remote copies (will be explained later), and these data are set in the order of write requests to the storage apparatus 102. On the other hand, numbers 11 and 12 correspond to journal copies, and are provided in order to transfer data at such a timing when a request issued from the storage apparatus 102 of a copy destination is received.

FIG. 10C indicates the volume management table 933. In this volume management table 933, an identifier 1021 of a volume managed by the storage apparatus 102, a use field 1022 of the volume, and a status 1023 for indicating as to whether or not the volume is used have been set. The user field 1022 of the volume corresponds to a control command volume, a data volume, a journal volume, a snapshot volume, and the like. Symbol "under use" in the status 1023 implies such a case that the host 101 has been set to an accessible status, and another case that write data has been stored.

FIG. 10D indicates the pair definition table 934. The following items are set to this pair definition table 934: a copy source apparatus identifier 1031 corresponding to an identifier of the storage apparatus 102 of a copy source; a copy source vol identifier 1032 corresponding to an identifier of a volume of the copy source; a copy destination apparatus identifier 1033 corresponding to an identifier of the storage apparatus 102 as a copy destination; a copy destination vol identifier 1034 corresponding to a volume of the copy destination; a type 1035; a JNLvol identifier 1036 corresponding to an identifier of a journal data volume to which journal data is stored; and a copy group identifier 1037. To the type 1035, either a remote copy (RC) or a journal copy (JC) is set which will be explained later. In the case of the journal copy, an identifier of a volume into which journal data is stored is set to the JNLvol identifier 1026. In such a case that data of plural volumes are copied as a group, the copy group identifier 1037 is set. In FIG. 10D, the copy group identifiers 1037 have been set to the numbers 6 and 7. The data which are stored into two volumes are copied in synchronism with each other at predetermined timing. It should also be noted that as to the number 5, although the copy destination apparatus identifier and the copy destination vol identifier have not been set, the JNLvol identifier has been set. This fact implies that journal data as to data stored in a copy source vol identifier 1:06 is merely acquired.

FIG. 10E shows the journal data management table 935. In this journal data management table 935, the following items have been registered: an identifier (vol identifier) 1041 of a volume into which journal data is stored; an address 1042 and a time stamp 1043 of a volume into which the latest journal data has been written; and also, an address 1044 and a time stamp 1045 of a volume from which journal data is read out. The time stamps 1043 and 1045 correspond to time instants when the write data are received by the storage apparatus. For instance, as to a volume 1:05, this volume implies that while data up to a time stamp of 09:52:30 are stored, such data up to a time stamp of 09:50:30 are read out. The volume 1:05 is understood that based upon the pair definition table of FIG. 10D, journal data with respect to the data of the data volume 1:04 has been stored. Also, data as to time stamps of 09:50:10 and 09:50:30 have been read out from this journal volume 1:05 as a journal copy, and then, have been set to the numbers 11 and 12 of the copy control table 935 of FIG. 10B. It should be understood that since storage areas of volumes are limited, if journal data are written in all of these storage areas, then these journal data are overwritten with respect to the previously read journal data. Also, a request flage 1046 of the journal data management table 935 is utilized by the storage apparatus 102 of a copy destination. As will be explained later, in the case of a journal copy, journal data is transmitted in response to a request issued from the storage apparatus 102 of a copy destination. A request flag 1046 indicates as to whether or not a transmission request of journal data is issued from the storage apparatus 102 of a copy destination to the storage apparatus 102 of a copy source. When a transmission request is issued, "1" is set, whereas when the journal data is acquired with respect to the request, "0" is set. FIG. 10E represents a journal data management table of the storage apparatus 102 of a copy source. Since this flag is not used, "unnecessary" has been set. It should also be noted that FIG. 10G shows an example as to a journal data management table of the storage apparatus 102 of a copy destination.

FIG. 10F shows the snapshot management table 936. In this snapshot management table 936, the following items are set: an identifier (data vol identifier) 1051 of a data volume which is an acquisition subject of a snapshot; an identifier (snapshot vol identifier) 1052 of a volume into which data of a snapshot has been stored; and a time instant 1053 when a snapshot is acquired.

FIG. 10G and FIG. 10H indicate a pair definition table 934 and a journal data management table 935, which are managed by the storage apparatus 102 of a copy destination. Items of information which is set are identical to those of FIG. 10D and FIG. 10E.

A first description is made of remote copy, journal copy, and data recovery process operations executed in the storage apparatus 102.

Figure 11:
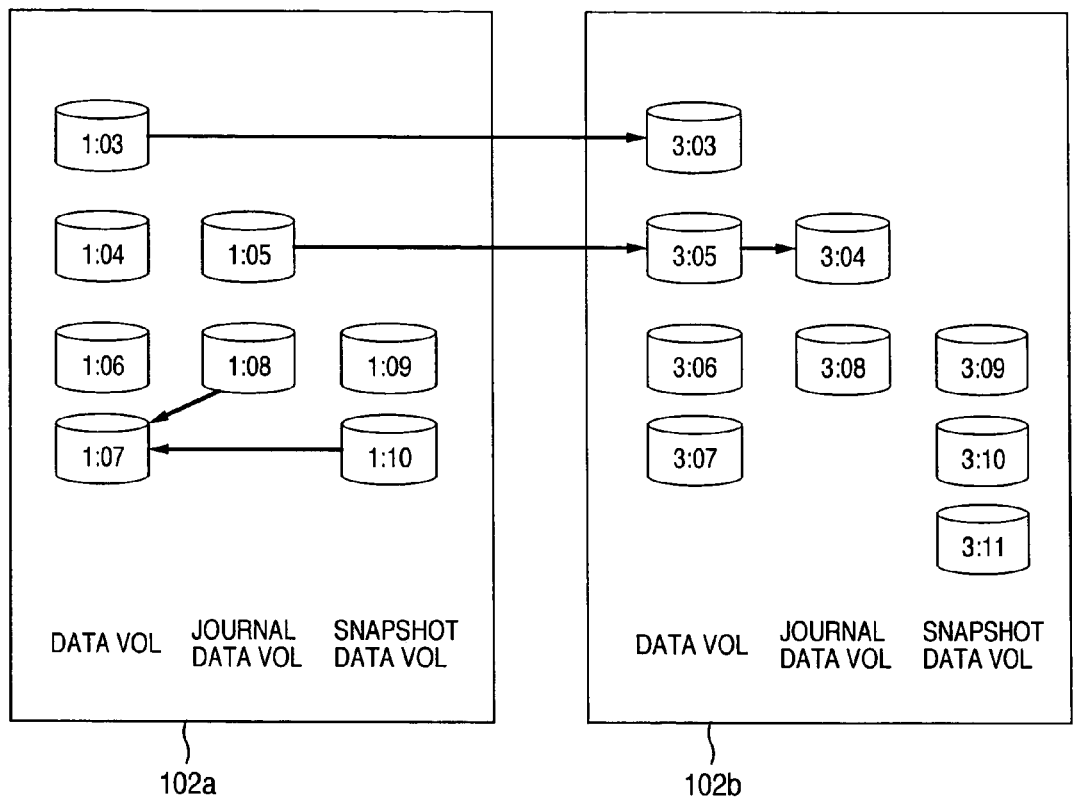
FIG. 11 is a diagram for representing a summary of a copy.

FIG. 11 is a diagram for indicating a conception idea of the remote copy, journal copy, and data recovery process operations. In this drawing, the storage apparatus 102 of a copy source is shown as the storage apparatus 102a, and the storage apparatus 102 of a copy destination is represented as the storage apparatus 102b.

An explanation is firstly made of a remote copy. This remote copy implies that data is transmitted which is stored from the storage apparatus 102 of a copy source to a data volume of the storage apparatus 102 of a copy destination.

Figure 12:
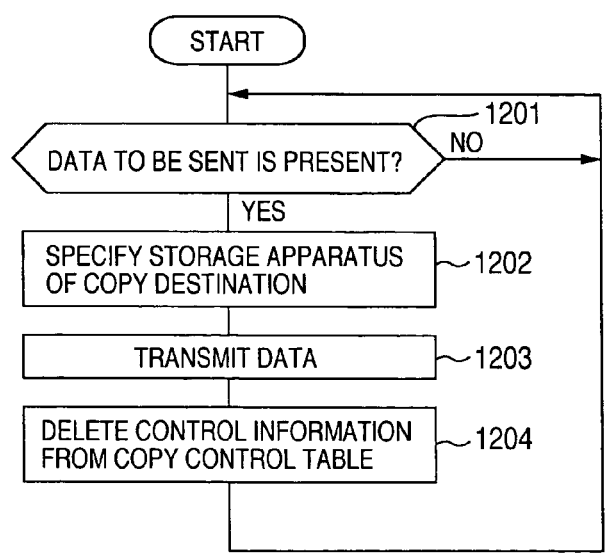
FIG. 12 is a flow chart for explaining process operations of a data transmitting program.

FIG. 12 is a flow chart for representing process operations of the data transmission program 913.

The data transmission program 913 judges as to whether or not there is data which should be transmitted to the copy control table 932 (step 1201).

If the control information has been set to the copy control table 932, then there are such data which should be transmitted. Also, these data are sequentially transmitted from data having a smaller number of the copy control table 932. When there are data which should be transmitted, the storage apparatus 102 of a copy destination is specified based upon the copy destination vol identifier 1015 of the control information and the copy destination vol identifier 1034 of the pair definition table 943 (step 1202), and both data and a write command, which have been stored in a cache memory, are transmitted to the specified storage apparatus based upon an address of the cache memory as to the copy control information (step 1203). When the transmission of the data is completed, the control information related to the transmitted data is deleted from the copy control table 932 (step 1204). Thereafter, in order to judge as to whether or not data which should be transmitted is present in the copy control table 932, the process operation is returned to the step 1201.

It should also be noted that the data which have been transmitted to the storage apparatus 102*b* are stored in the cache memory 903*b* of the storage apparatus 102*b*, and are sequentially stored in the corresponding storage medium 106*b* which corresponds to the data volume 122*b*.

Next, a description is made of journal copy. The journal copy is to transmit journal data from the storage apparatus 102 of a copy source to the storage apparatus 102 of a copy destination. Concretely speaking, as shown in FIG. 11, journal data of such a data which has been stored in a volume 1:04 of the storage apparatus 102*a* is stored in a volume 1:05; this journal data is stored in a volume 3:05 of the storage apparatus 103*b*; and thereafter, data which is contained in this data is stored in a volume 3:04. The journal data will be explained later. It should also be noted that the transmission of the journal data from the storage apparatus 102*a* is carried out in response to the transmission request of the storage apparatus 102*b*.

Figure 13:
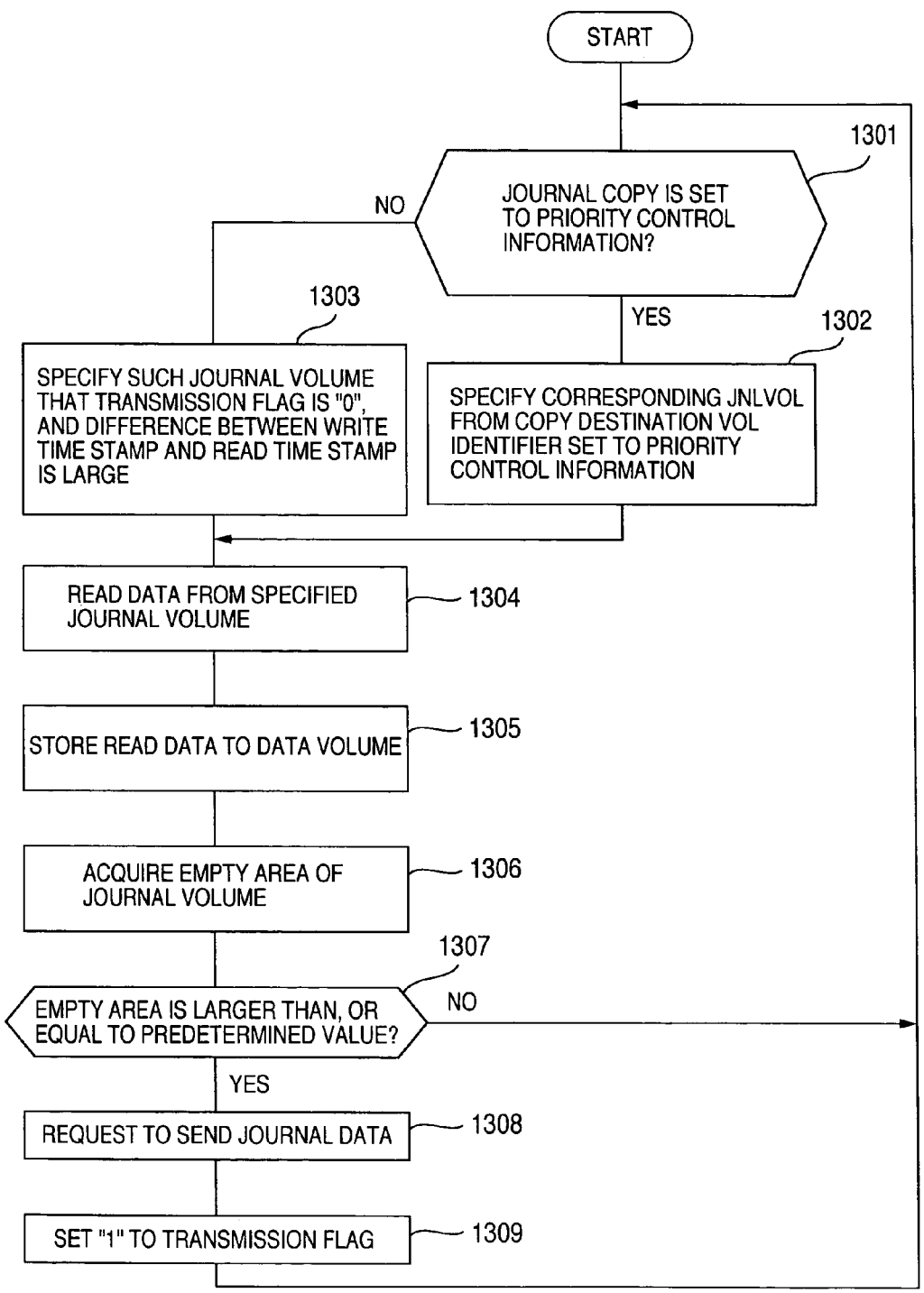
FIG. 13 is a flow chart for describing process operations of a journal data reflecting program.

FIG. 13 is a flow chart for explaining process operations of the journal data reflection program 915 of the storage apparatus 102*b*. While the journal data reflection program 915 refers to priority control information of a control table of the storage apparatus 102*b*, the journal data reflection program 915 judges as to whether or not journal copy has been set (step 1301). In the case that the journal copy has been set to the priority control information ("YES" in step 1301), the journal data reflection program 915 specifies both a copy destination vol identifier which has been set to the priority control information, and a JNLvol identifier for storing the journal data from the pair definition table of the storage apparatus 102*b* (step 1302), and the process operation is advanced to a process operation of a step 1304. When the journal copy is not set to the priority control information ("NO" in step 1301), "0" is set to the request flag of the journal data management table; and such a journal volume that a difference between a write time stamp and a read time stamp is large is specified (step 1303). FIG. 10G indicates the journal data management table 935 of the storage apparatus 102*b*. In this table, volumes 3:05, 3:12, and 3:13 correspond to journal volumes which are used in journal copy. The write time stamp corresponds to such a time stamp as to the latest journal data stored in the journal data, whereas the read time stamp corresponds to a time stamp of journal data which has been read so as to reflect data onto a data volume. As a consequence, such a fact that the write time stamp is not made coincident with the read time stamp implies that there is such a data which is not reflected to the data volume. In this case, such a journal data whose request flag has been set to "1" corresponds to the journal data whose transmission is request with respect to this journal volume. As to the journal volumes 3:05 and 3:13 in which the transmission of the journal data has not yet been requested and the transmission flag has been set to "0", a volume 3:05 is specified based upon a difference between the write time stamp and the read time stamp in the step 1303. It should also be noted that when a copy group has been set, a volume is specified in the unit of this copy group.

Next, the journal data reflection program 915 reads out journal data from the journal volumes specified in the steps 1302 and 1303 (step 1304), stores the read data into the corresponding volume data (step 1305), and acquires an empty area (step 1306). In this case, the empty area implies such an area into which the read journal data has been stored. In other words, after the data has been reflected, since the journal data is no longer required, this area is used as an empty area, and in the case that the journal data is received, the new journal data is stored in this area. The journal data reflection program 915 judges as to whether or not empty areas are larger than, or equal to a predetermined value (step 1307). If the empty areas are larger than, or equal to the predetermined value, then such a journal data transmission request is transmitted to the storage apparatus of the copy source, which contains a copy source vol identifier which forms a pair by utilizing this journal volume, a copy destination vol identifier, and information of an empty area (step 1308); "1" is set to a request flag of a journal data management table; and thereafter, the process operation is returned to the step 1301. Also, if the empty areas are not larger than, or equal to the predetermined value, then the process operation is also returned to the step 1201. As will be discussed later, the journal data transmission request is stored as data in a control command volume, and is sent to the storage apparatus of the copy source, as will be explained later.

Figure 14:
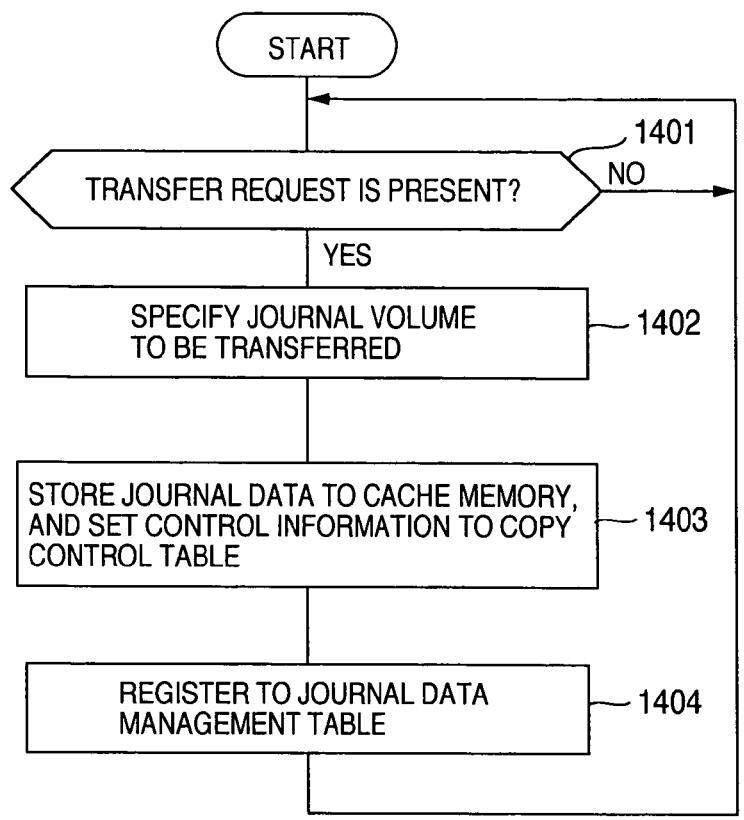
FIG. 14 is a flow chart for describing process operations of a journal data transmitting program.

FIG. 14 is a flow chart for explaining process operations of the journal data transmission program 914 of the storage apparatus 102*a*. The journal data transmission program 914 is executed by receiving a journal data transmission request which contains information of an empty area from the storage apparatus 102*b*. When the journal data transmission request is issued ("YES" in step 1401), the journal data transmission program 914 specifies the corresponding journal volume based upon a copy source vol identifier, a copy destination vol identifier, and a pair definition table (step 1402). The journal data transmission program 914 reads out journal data from the specified journal volume, stores the journal data into a cache memory, and also, sets control information to a copy control table (step 1403). Since the journal data is read, the journal data management table is changed (step 1404), and the process operation is returned to the step 1401. It should also be noted that the journal data is read out until an empty capacity contained in the journal data transmission request is filled. In the case that the journal data up to the write time stamp are read out before the capacity is filled, the journal data whim have been read are specified.

Next, a description is made of data recovery process operations. A data recovery process operation is different from the previously explained remote copy and journal copy process operations in which the data is transferred from the storage apparatus 102*a* to the storage apparatus 102*b*, but implies such a process operation which is carried out in each of the storage apparatus. This data recovery process operation is to change data of a volume to such a condition of a time instant when this process operation is requested from the host 101.

In this case, such a case that a data recovery process operation is carried out by the storage apparatus 102*a*.

As indicated in FIG. 11, journal data is formed with respect to the data stored in the volume 1:06, and then, the formed journal data is stored in the volume 1:08. In this example, the data up to 09:40:00 have been stored in the volume 1:06, and the journal data up to 09:40:00 have been stored in the volume 1:08 as shown in FIG. 10E. Also, with respect to the data stored in the volume 1:06, as represented in FIG. 10F, the data (snapshot data) of 07:00:00 has been stored in the volume 1:09, and the data of 08:00:00 has been stored in the volume 1:10. Under such a condition, for example, in the case that the request for recovering the data to the data of 08:40:00 is issued from the host 101, the snapshot data of the volume 1:10 is copied to the volume 1:07. As a result, the volume 1:07 becomes such a condition of 08:00:00. Next, among the journal data stored in the volume 1:08, the journal data from 08:00:00 to 08:40:00 are read out, and then, data contained in the journal data is stored in the volume 1:07. As a result, the volume 1:07 is brought into the status of 08:40:00. As explained above, the volume is recovered to such a volume at a time instant in response to the request issued from the host.

It should also be understood that although the data to be recovered in formed in the volume 1:07, this data may be alternatively formed with respect to the volume 1:06 into which the data has been stored.

Figure 15:
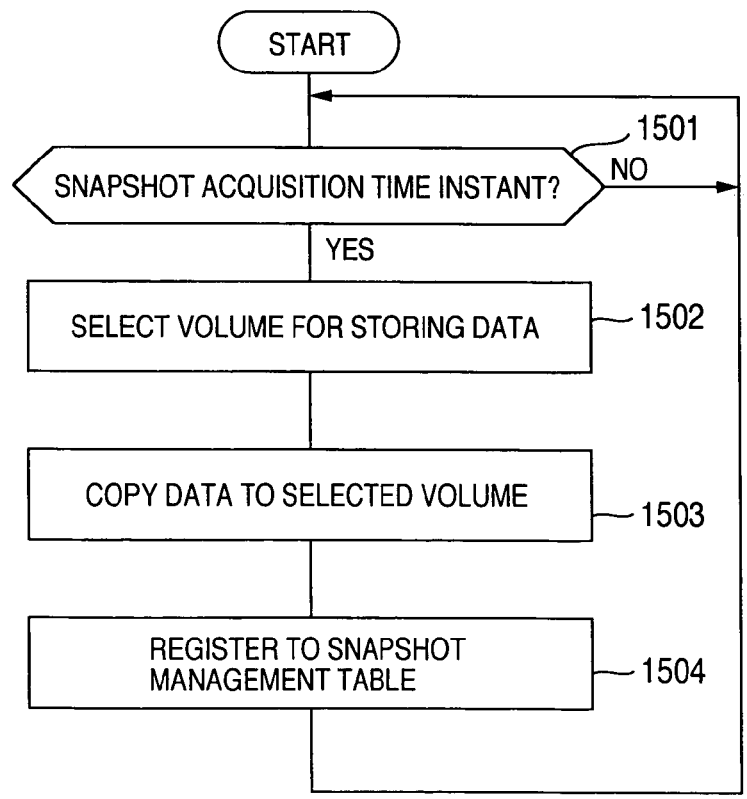
FIG. 15 is a flow chart for explaining process operations of a snapshot acquiring program.

FIG. 15 indicates a flow chart for explaining process operations of the snapshot acquisition program 916.

The snapshot acquisition program 916 monitors a starting time instant and an interval of the control table 931 by using a clock of the storage apparatus 102 (step 1501). When the present time becomes a time instant for acquiring snapshot based upon the starting time instant and the interval ("YES" in step 1501), the snapshot acquisition program 916 selects a volume used to store snapshot data (step 1502), and copies data of a volume which constitutes a subject for acquiring a snapshot to the selected volume (step 1503). When the copying operation of the data is ended, an identifier of the volume where the snapshot data is stored and the acquired time instant are set to the snapshot management table (step 1504). Thereafter, the process operation is returned to the step 1501. As to the selection of the volume for storing the snapshot data in the step 1502, the snapshot acquisition program 916 refers to the volume management table shown in FIG. 10C, sets the snapshot to the sort, and selects such a volume whose status is unused. In FIG. 15, the method for acquiring the snapshot data by copying the data has been explained. Alternatively, new snapshot data may be formed based upon snapshot data and journal data, which have already been acquired in the below-mentioned manner. Concretely speaking, as to the data of the snapshot with respect to the volume 1:10 of FIG. 11, such a snapshot data at the time instant 08:00:00 may be produced in such a manner that data of the volume 1:09 at a time instant 07:00:00 is copied to the volume 1:10, and thereafter, journal data which have been stored in the volume 1:08 until a time instant of 08:00:00 are stored.

Figure 16:
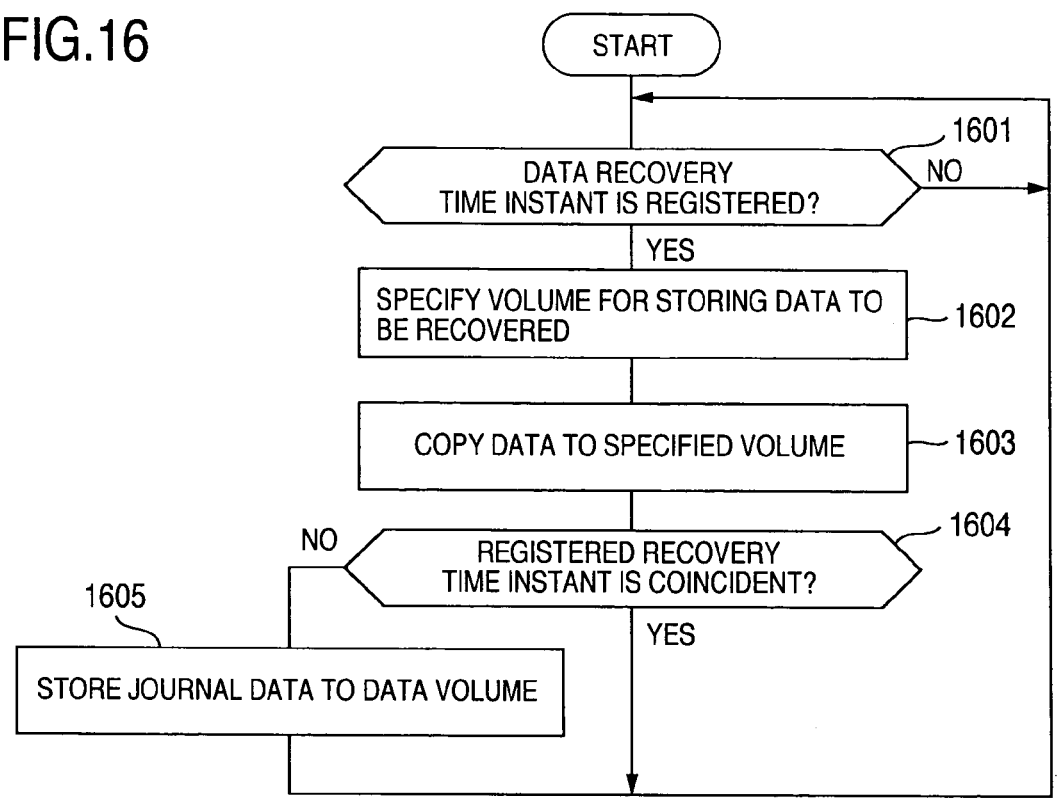
FIG. 16 is a flow chart for describing process operations of a data restore processing program.

FIG. 16 is a flow chart for showing process operations of the data recovery process program 917. The data recovery process program 917 monitors a data recover time instant of the control table 931 (step 1601). When the data recovery time instant is registered, the data recovery process program 917 specifies such a volume into which snapshot data approximated to the data recovery time instant has been stored based upon a data volume identifier of the control table 931 and the snapshot management table (step 1602). Next, a volume which stores data to be recovered is specified (step 1603). If the data recovery volume has been registered in the control table 931, then this volume is assumed as the volume for storing the data to be recovered. If not yet been registered, then such a data volume which constitutes a subject for acquiring the snapshot data is assumed as the volume for storing the data to be recovered. Next, the data recovery process program 917 copies the snapshot data of the volume specified in the step 1062 to the specified volume (step 1604), and judges as to whether or not the acquired time instant of the specified snapshot data is made coincident with the registered recovery time instant (step 1605). If the acquired time instant of the specified snapshot data is not made coincident with the registered recovery time instant, then the journal data up to the recovery time instant are read out from the journal volume, and the read journal volume are stored in the volume to which the snapshot data is copied (step 1606). Thereafter, the process operation is returned to the step 1601. It should also be noted that if the acquired time instant of the specified snapshot data is made coincident with the registered recovery time instant in the step 1605, then the process operation is returned to the step 1601.

As previously explained, the remote copy processing operation, the copying process operation by the journal data, and the data saving process operation executed in the storage apparatus 102 have been described.

In the above-explanation, such a case that the data is transmitted from the storage apparatus 102a to the storage apparatus 102a to the storage apparatus 102b has been described. Alternatively, another case that the data is transmitted from the storage apparatus 102b to the storage apparatus 102a may be realized by employing a similar arrangement.

Next, a description is made of the control command process program 911, the I/O process program 912, the data acquisition program 918, the data saving program 919, and the priority control program 920.

Figure 17:
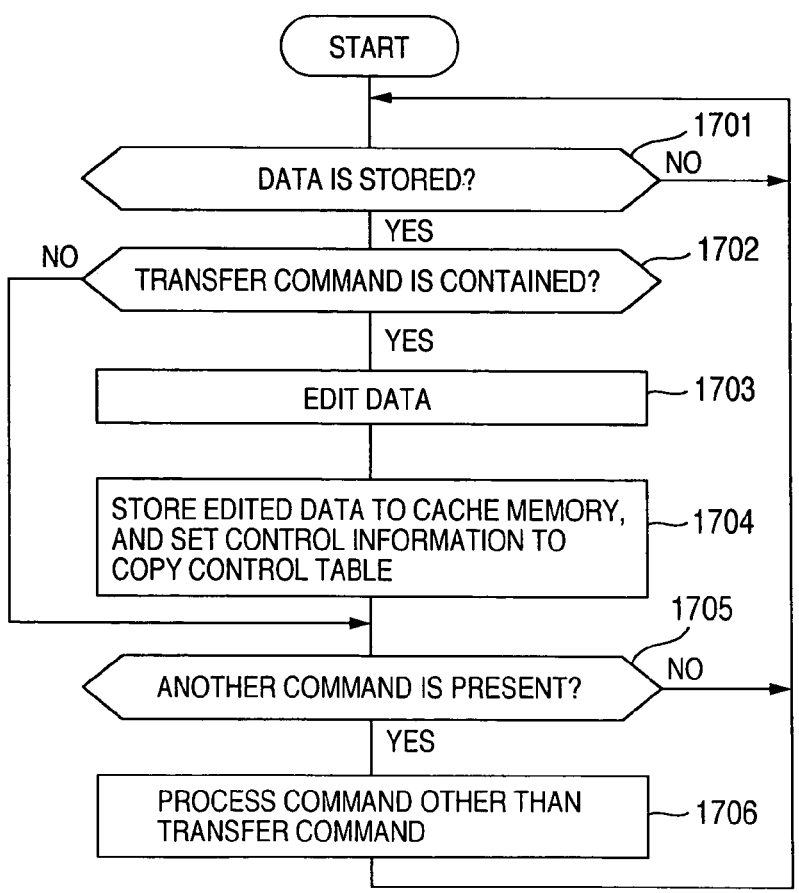
FIG. 17 is a flow chart for explaining process operations of a control command processing program.

FIG. 17 is a flow chart for describing process operations of the control command process program 911.

The control command process program 911 judges as to whether or not data transmitted from the host 101 has been stored in such a volume which is registered as "control command" to the volume management table 933 (step 1701). In the case that the data has not been stored, the process operation is returned to the step 1701. In the case that the data has been stored, the control command process program 911 judges as to whether or not a transfer command is contained in this stored data (step 1702). When the transfer command is contained, the control command process program 911 edits the data (step 1703), stores the edited data to a cache memory, and also, sets control information to a copy control table (step 1704). In this case, the editing operation of the data implies such a process operation that a command and a parameter, which succeed the transfer command, are derived so as to the converted into data having a predetermined format.

Next, the control command process program 911 judges as to whether or not there is another command other than the transfer command (step 1705). When there is the command other than the transfer command, a process operation of this command is carried out. As the process operation of this command, the data acquisition program 918 and the data saving program 919 are executed. Otherwise, a registering process operation for setting a parameter to a control table is executed, and also, a deleting process operation for deleting a parameter registered in the control table is carried out.

Figure 18:
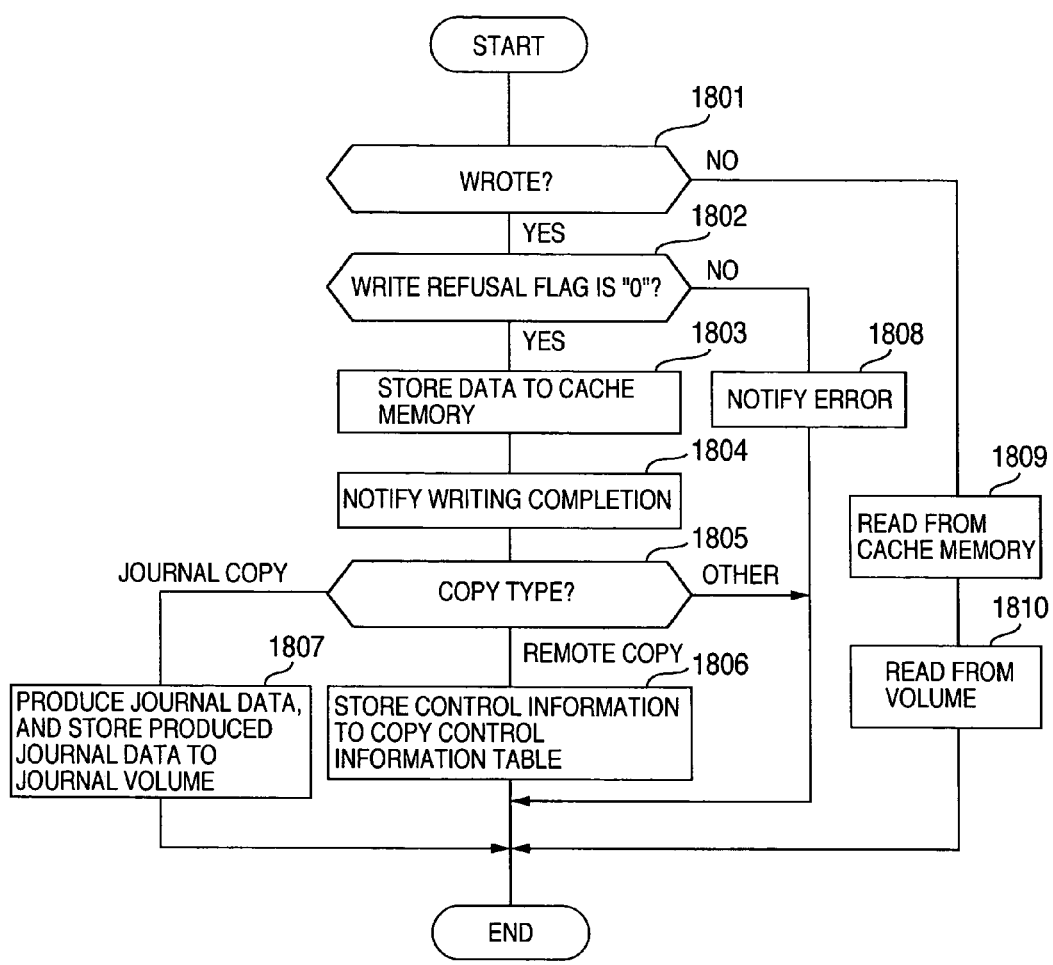
FIG. 18 is a flow chart for describing process operations of an I/O processing program.

FIG. 18 is a flow chart for explaining process operations of the I/O process program 912.

This I/O process program 912 executes process operations in the case that I/O is transmitted from the host 101 and another storage apparatus. For example, in the system shown in FIG. 1, the storage apparatus 102a is to process I/O which is mainly transmitted from the host 101a and the host 101d, whereas the storage apparatus 102b is to process I/O which is transmitted from the host 101b, the storage apparatus 102a and the storage apparatus 102c. In this case, as an example of I/O, there are a data reading request, and a writing request with write data.

When I/O is sent, the I/O process program 912 judges as to whether or not the sent I/O is a writing request (step 1801). When the I/O corresponds to the writing request, the I/O process program 912 judges s to a write refusal flag of a control table is equal to "0" (step 1802). When the write refusal flag is equal to "0", the I/O process program 912 stores the write data into the cache memory (step 1803), and notifies such a message that the writing operation is accomplished to the transmission source (step 1804). It should be understood that at such a time instant when the write data is stored in the cache memory, a time stamp with respect to data is set. Next, the I/O process program 912 refers to the pair definition table 934 in order to judge a type of a copy (step 1805). The copy type is judged by referring to information of a type 1035 based upon an identifier of a volume contained in the write request and the copy source vol identifier 1032 of the pair definition table 934. When the judged copy type corresponds to the remote copy type, control information is stored in the copy control table 932 (step 1806), and the process operation is accomplished. In this case, the above-explained control information corresponds to a time stamp, an address of a cache memory, a volume identifier of a copy source, a volume identifier of a copy destination. Also, in the case that an identifier has been attached to a writing request, this identifier also becomes the control information.

When the copy type is judged as a journal copy in the step 1805, journal data is formed, and then, the formed journal data is stored in a journal volume (step 1807). The journal data is constituted by a header portion and a data portion. To the header portion, the following items are stored: a sequence number; a time instant when write data is received; an identifier of a volume contained in a writing request; a logic address of a volume to which the write data is stored; a data size; and an identifier if this identifier has been attached to the writing request are stored in this head portion. The write data is stored in the data portion. Then, the formed journal data is stored in a volume. At this time, an address of the volume into which the journal data is stored, and a time stamp are registered to a journal data management table.

When the copy type is judged as no one of the remote copy and the journal data copy in the step 1805, the process operation is directly ended.

Also, in such a case that the write refusal flag is "1" in the step 1802, the I/O process program 912 notifies an "error" with respect to a transmission source of a writing request (step 1808), and the process operation is accomplished. As previously explained, the write refusal flag 1001 is set to "1" when there is a certain possibility that the relevant site may be damaged by disaster. As a consequence, even before disaster happens to occur, since a writing request issued from either the host 101 or the storage apparatus 102, it is possible to avoid that the damages are enlarged. In other words, even in such a case that a completion response of a writing operation has been sent to the host 101 and the storage apparatus 102 under such a condition that data has been stored in the cache memory, if a failure happens to occur while the data is being stored from the cache memory 903 into the storage medium 106, then such an opportunity may occur in which the data cannot be stored into the storage medium 106 under normal condition. In this failure case, it is not clear that which data have already been stored in the storage medium 106, resulting in a lengthy recovery time. To the contrary, in accordance with the information processing system of this embodiment, since the "error" is returned with respect to the writing request in advance, the above-explained problem can be prevented.

On the other hand, in the case that I/O issued from the host 101 is the reading request ("NO" in step 1801), the I/O process program 912 checks as to whether or not data for constituting a subject is present in the cache memory 903 (step 1809). If there is such a subject data, then this data is sent to the transmission source. If there is no such a subject data, then the I/O process program 912 reads out the data from the storage medium 106 (step 1810), and transmits the read data to the transmission source.

Figure 19:
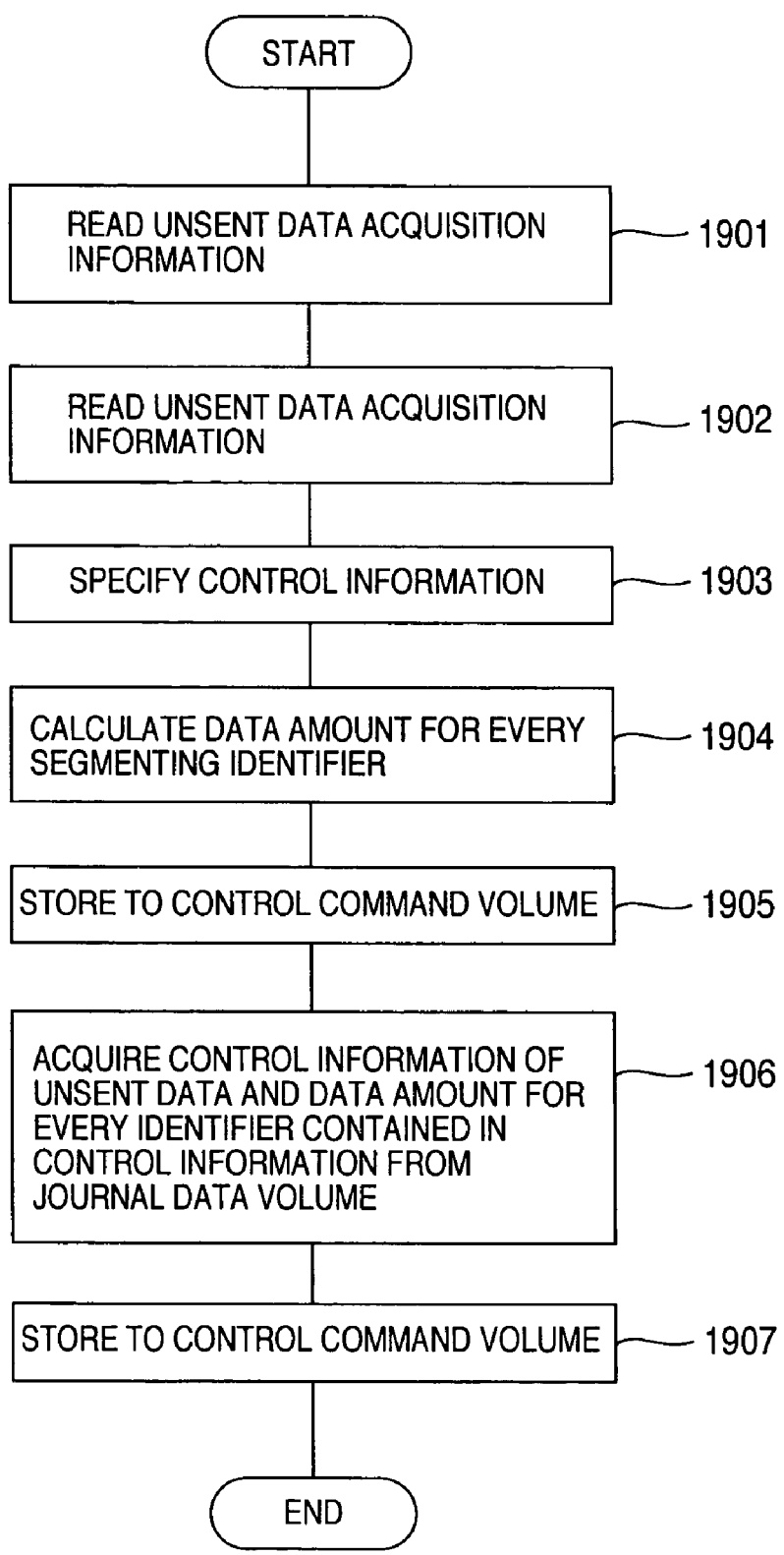
FIG. 19 is a flow chart for explaining process operations of an unsent data information acquiring program.

FIG. 19 is a flow chart for explaining process operations of the unsent data information acquisition program 918. The unsent data information acquisition program 918 is executed by the control command process program 911. In other words, both unsent data acquisition information and data which contains an execution instruction of the unsent data acquisition program 918 are written from the host 101 to the control command volume 121, and the control command program 911 executes the unsent data information acquisition program 918 based upon this data. It should be noted that the above-explained unsent data acquisition information contains the copy source apparatus identifier, the copy source vol identifier, the copy destination apparatus identifier, and the copy destination vol identifier, as indicated in FIG. 3E.

The unsent data information acquisition program 918 reads out the unsent data acquisition information stored in the control command volume 121 (step 1901). Next, such a control information which is coincident with the copy source vol identifier and the copy source vol identifier, which are contained in the unsent data acquisition information, is specified in the copy control table 931 (step 1902). For example, in such a case that the unsent data acquisition information corresponds to FIG. 3E and the copy control information table corresponds to FIG. 10B, the control information except for the numbers 1, 3, 14, 15 is specified. Next, a data amount for every segmenting identifier is calculated within the specified control information (step 1903). The data amount for every segmenting identifier is calculated in the below-mentioned manner. For instance, in the case of the segmenting identifier of the number 10 shown in FIG. 10B, a plurality of control information having time stamps smaller than this time stamp and segmenting identifiers are specified. In this case, such control information of the numbers 7 and 9 are specified. Then, a total amount of the data amounts as to the numbers 7, 9, 10 is assumed as the data amount of the segmenting identifier. Similarly, data amounts as to other segmenting identifiers are calculated.

The data amounts which have been calculated in accordance with the above-explained manner are stored as the unsent data information into the control command volume 121 in combination with the segmenting identifier, the time stamp, the copy source apparatus identifier, the copy destination apparatus identifier, the copy source vol identifier, and the copy destination vol identifier (step 1904). Similarly, a data amount for every segmenting identifier is calculated with respect to journal data which has not yet been sent from the journal management table 935 (step 1904). The unsent journal data corresponds to a portion of a difference (between) in writing and reading of the journal management table 935. An ending identifier contained in journal data present between these writing and reading operations is specified, and then a data amount of data related to this specified segmenting identifier is calculated. This calculation method is the same method as in the case that the data amount is calculated from the control information registered in the copy control table 932. In this case, there are some possibilities that a portion of the journal data segmented by the segmenting identifier constitutes data to be sent, and the partial journal data has been stored in the cache memory 903. As a consequence, in the case that the segmenting identifier is specified from the journal data, the unsent data information acquisition program 918 calculates a data amount with reference to the copy control table 932.

The data amount which has been calculated in accordance with the above-explained manner is stored as the unsent data information into the control command volume 121 in combination with the segmenting identifier, the time stamp, the copy source apparatus identifier, the copy destination apparatus identifier, the copy source vol identifier, and the copy destination vol identifier (step 1905). Then, the process operation is ended.

Figure 20:
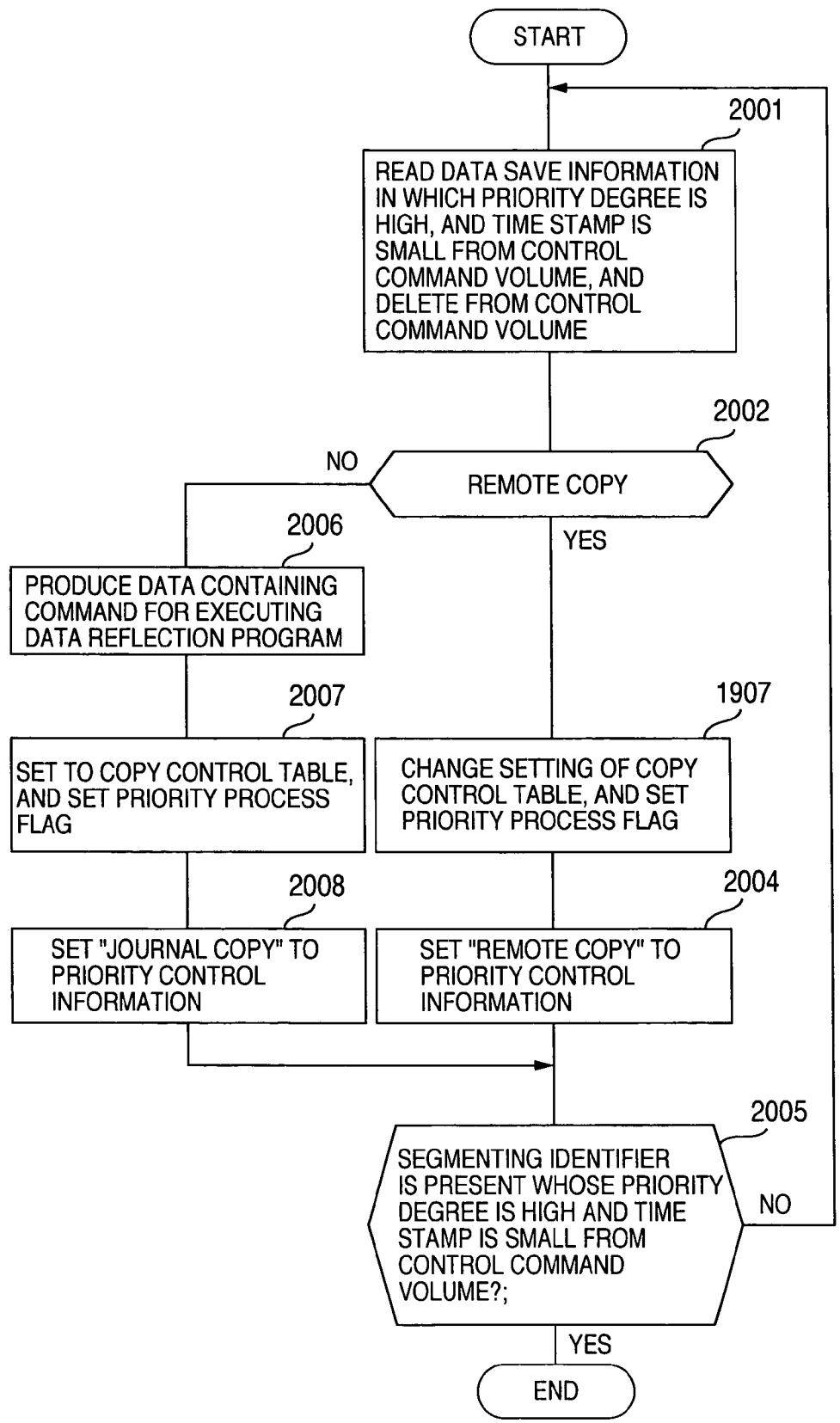
FIG. 20 is a flow chart for describing process operations of a data saving program.

FIG. 20 is a flow chart for describing process operations of the data saving program 919. This data saving program 919 is executed by the control command process program 911. That is to say, both data saving information and a data saving program execution command are stored from the host 101 to the control command volume 121, and the data saving program 919 is executed by the control command process program 911. The above-described data saving information contains the segmenting identifier, the time stamp, the copy source apparatus identifier, the copy destination apparatus identifier, the copy source vol identifier, the copy destination vol identifier, and the priority degree, as shown in FIG. 3G.

The data saving program 919 shown in this drawing contains process operations on the transmission side and the reception side as to the remote copy. The data in the journal copy, or the journal data.

The data saving program 919 reads out such a data saving information whose priority degree is high and whose time stamp is small from the data saving information stored in the control command volume 121, and also deletes this read data saving information from the control command volume 121 (step 2001). Next, the data saving program 919 judges as to whether this data corresponds to the remote copy, or the journal copy with reference to the pair definition table 934 based upon the copy source apparatus identifier, the copy destination apparatus identifier, the copy source vol identifier, and the copy destination vol identifier, which are contained in the read data saving information (step 2002). When the data corresponds to the remote copy, the copy control table 932 is changed in order that the data specified based upon the read data saving information is transferred with a top priority, and then, a priority process flag is set (step 2003). For example, while the copy control table 932 is brought into the condition of FIG. 10B, in the case that data saving information as to a time stamp 09:50:00, a copy source vol identifier 1:03, and a copy destination vol identifier 3:03 is read in the step 2001, the control information having the numbers 2, 4, 5 is set to the numbers 1, 2, 3, and thus, other control information is changed in order to be matched thereto. Also, "1" is set to the priority flags of the numbers 1, 2, 3. This result is represented in FIG. 10H. It should also be understood that as to the change in the copy control table 932, setting of such a portion that the priority process flag has already been set is not changed. In other words, in such a case that under the condition of FIG. 10H, the control information of the numbers 7, 9, 10 is changed, the control information of the numbers 7, 9, 10 is set to those of the numbers 3, 4, 5. As previously explained, after the copy control table 932 has been changed, "remote copy" is set to the priority control information 1003 of the control table 931 (step 2004). As a result, the data transmission program in the remote copy is executed with a top priority. Next, the data saving program 919 judges as to whether or not data saving information whose time stamp is small is present among the data saving information stored in the data control command volume 121 (step 2005). If such a data saving information is present, then the process operation is returned to the step 2001. If such a data saving information is not present, then the process operation is accomplished.

On the other hand, in the case that the data corresponds to the journal copy in the step 2002, such a data is produced which is to issue a journal data transmission request from the storage apparatus 102 of a copy destination (step 2006). As previously explained, when the data is the journal copy, the journal data is transmitted from the storage apparatus 102 of the copy source to the storage apparatus 102 of the copy destination in response to the journal data transmission request issued from the storage apparatus 102 of the copy destination. As a consequence, in the storage apparatus of the copy destination, a journal data reflection program is executed with a top priority. As a result, both a setting command of the priority control information of the control table, and such a data are produced in which "journal copy" set to the priority control information, a copy source vol identifier, and a copy destination vol identifier are used as a parameter. When the above-explained information is set to the priority control information of the control table, the journal data reflection program issues a journal data transmission request in such a manner that the data is stored in the journal volume which is specified by the set copy source identifier and the set copy destination identifier with a top priority.

The control information is set to the copy control table in such a manner that the data stored in the step 2006 is stored in the cache memory, and is transferred with a top priority, and then the priority process flag is set (step 2007). Furthermore, "journal copy" is registered in the priority information of the control table (step 2008). As a consequence, the journal data transmission program 914 is executed with a top priority in the storage apparatus 102 of the copy source.

Figure 21:
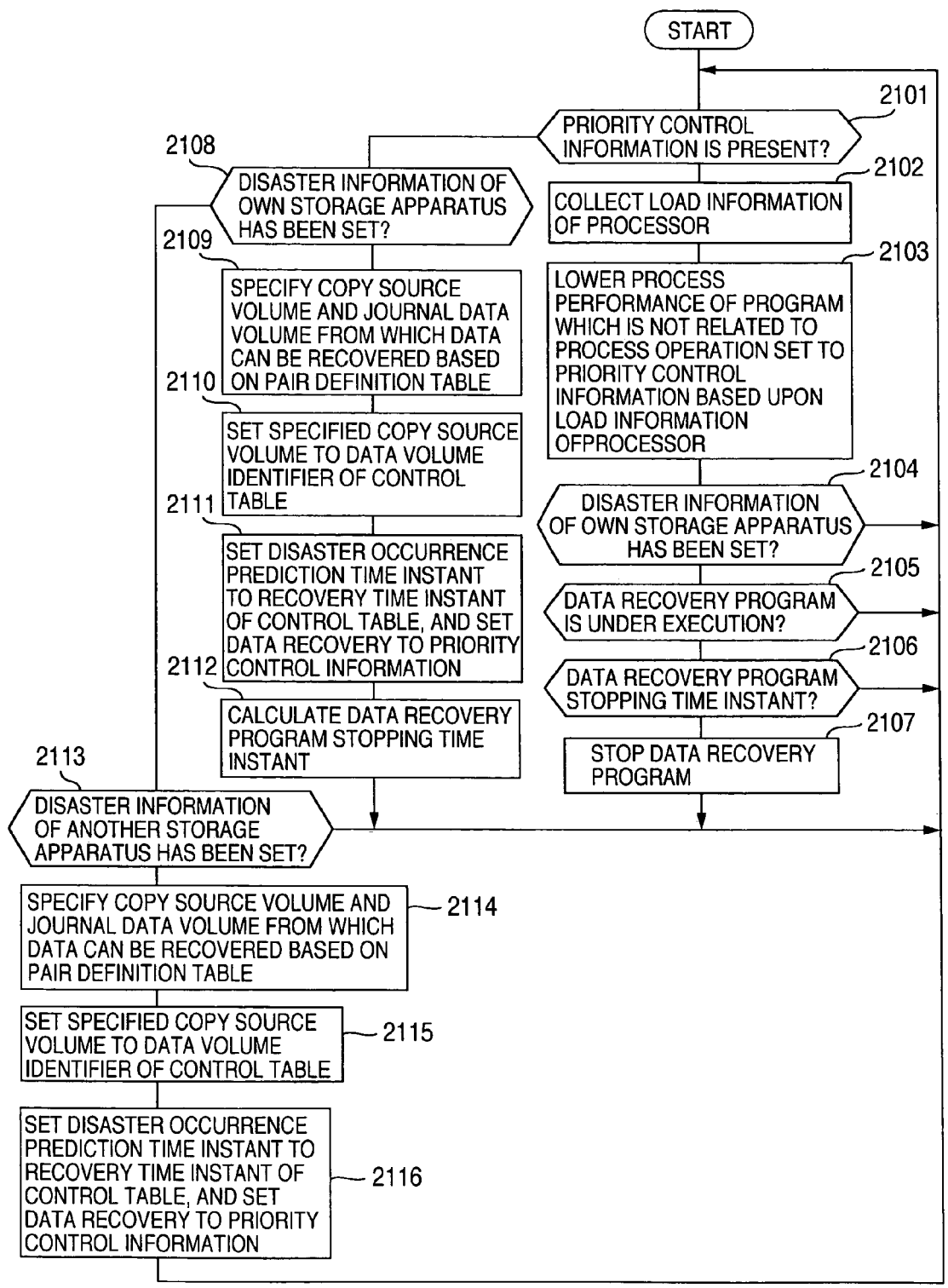
FIG. 21 is a flow chart for explaining process operations of a priority control program.

FIG. 21 is a flow chart for explaining process operations of the priority control program 920.

The priority control program 920 judges as to whether or not such a program which should be processed with a top priority is present based upon priority control information of the control table 931 (step 2101). If the priority control information has been set, loads of a processor are collected (step 2102), and processing performance of a program which is not related to the priority control information is lowered (step 2103). For instance, in such a case that the program is executed in a time divisional manner, when the remote copy has been set as the priority control information, the execution time of the data transmission program is prolonged, and the execution times of other programs are shortened. If the data transmission program is not sufficiently executed, then the executions of the programs are stopped which have no relationship with the remote copy, for example, the journal data reflection program 915 and the journal data transmission program 914. Next, steps 2104 to 2107 correspond to process operations which are provided in order to stop the execution of the data reflection program before a disaster occurrence prediction time instant in such a case that this data reflection program is executed by a storage apparatus 102 where an occurrence of disaster is predicted in steps 2108 to 2112. Firstly, the data reflection program judges as to whether or not disaster information of the own storage apparatus 102 has been set (step 2104). When the disaster information has been set, the data reflection programs judges as to whether or not the data recovery program is being executed (step 2105). When the data recovery program is being executed, the data reflection program judges as to whether or not the present time reaches a stopping time instant of the data recovery program acquired in a step 2112 (will be explained later) (step 2106). When the present time reaches the stopping time instant, the data recovery program is stopped (step 2107), and the process operation is returned to the step 2101. In such a case that a data recovery operation is carried out while disaster occurs, there are some possibilities that failure data adversely influenced by the disaster is stored. To avoid this possibility, the data recovery process operation is stopped before the disaster occurs.

On the other hand, in such a case that the priority control information has not been set in the step 2101, the priority process program 920 judges as to whether or not the disaster information of the own storage apparatus 102 has been set (step 2108). When the priority control information has been set, such a copy source volume and a journal data volume from which data can be recovered is specified from the pair definition table 934 (step 2109). For example, both the copy source volume and the journal data volume of the number 5 shown in FIG. 10D are specified. Next, the specified copy source volume is set to a data volume identifier of the control table 931 (step 2110), a disaster occurrence prediction time instant is set to the control table 931, and a data recovery is set to the priority control information (step 2111). Finally, a data recovery program stopping time instant is obtained (step 2112), and then, the process operation is returned to the step 2101. It should also be noted that as the data recovery program stopping time instant, a disaster occurrence prediction time instant may be employed. Otherwise, such a time instant before the disaster occurrence time instant by a predetermined time may be employed. As previously explained, in the step 2108 through the step 2112, the data recovery control operation is executed within such a storage apparatus 102 which is damaged by the disaster. As a result, even when either the host 101 or the storage apparatus 102 are brought into shutdown statuses due to the disaster, the host 101, or the storage apparatus 102 can immediately restart the business based upon the data obtained before the disaster occurs.

Also, in such a case that the disaster information of the own storage apparatus 102 has not been set in the step 2108, the priority control program 920 judges as to whether or not disaster information of another storage apparatus 102 has been set in the control table 913 (step 2113). When the disaster information of another storage apparatus 102 has been set, a copy source volume and a journal data volume, from which data can be recovered, are specified from the pair definition table 934 (step 2114). Next, the specified copy source volume is set to a data volume identifier of data recovery control information of the control table 931 (step 2115). Also, a disaster occurrence prediction time instant is set to a recovery time instant of the control table 931, and the data recovery is set to the priority control information (2116). These steps 1214 to 1216 correspond to the process operations executed in the storage apparatus 102 of the copy destination. For instance, in such a case that either a remote copy or a journal copy is carried out from the storage apparatus 102a to the storage apparatus 102b of FIG. 1, and furthermore, snapshot data and journal data are acquired by the storage apparatus 102a, the storage apparatus 102a produces data immediately before disaster occurs. As a consequence, in the case that the storage apparatus 102a is brought into a failure and the business is succeeded to the storage apparatus 120b, the storage apparatus 102b can immediately execute the business based upon the data produced before the disaster occurs.

It should also be understood that when the judgement results made in the step 2101, the step 2108, the step 2113 become "NO", the process operation is set to a normal process operation and is returned to the step 2101. The normal process operation implies that for instance, when a time divisional process operation is carried out, execution times of programs under executions are equally allocated. Also, in the above-described step 2103, the follow explanation has been made that the processing performance of the program which has no relationship with the process operation set to the priority control information is lowered by the processing operation of the processor. However, for instance, when the priority control information of the remote copy is set from the storage apparatus 102a and the storage apparatus 102c, there are some possibilities that the load given to the storage apparatus 102b is increased. In this case, a remote copy requested from such a storage apparatus 102 which is close to the occurrence time instant set to the control table may be processed with a top priority. Similarly, a remote copy requested from such a storage apparatus whose disaster scale is larger may be processed with a top priority. To this end, for example, data which is processed with a top priority may be stored from a cache memory to a volume of a copy destination. Alternatively, in the I/O process program 912, an error may be returned with respect to a writing request issued from a storage apparatus which is not processed with a to priority in several rates.

In this embodiment, the disaster scale has been exemplified. Normally, a storage apparatus has been installed in a building. A condition as to whether or not a failure happens to occur in a storage apparatus due to an earthquake may be considered based upon a relationship with an earthquake-proof strength of this building. In other words, in FIG. 3B, the host 101 manages the disaster withstandable permission values of the storage apparatus 102. Alternatively, the host 101 manages disaster withstandable permission value of the housing in addition to the above-described disaster withstandable permission values of the storage apparatus 102. Then, the host 101 which receives the disaster information may calculate a difference between the disaster withstandaable permission value of the storage apparatus 102 and the disaster withstandable permission value of the housing, and may notify this calculated difference to the storage apparatus. For instance, in such a case that the storage apparatus 102b of FIG. 1 receives the differences between the disaster withstandable permission values of the storage apparatus 102a, 102d, 102c and the disaster withstandable permission value of the housing from the site A and the site C, the storage apparatus 102b may process a copy of data with a top priority with respect to such a storage apparatus having a larger difference.

It should also be understood that the above-explained embodiment has exemplified the earthquake. Alternatively, even in disaster other than this earthquake, if information capable of judging as to whether or not data should be saved, for example, an occurrence prediction time instant and a disaster scale is available, then this information may be applied.

In the above explanation, the data is saved based upon the disaster prediction information. Alternatively, the system may be operated in such a manner that data is transmitted from a copy source storage apparatus to a copy destination storage apparatus up to a predetermined time instant irrespective of the disaster prediction information. As a result, a coincidence between the data of the copy source and the data of the copy destination may be guaranteed in a predetermined time period.

FIG. 22 shows an example of a copy management table which is set to a host 101 by a manager. This copy management table has been stored in the memory of the host 101. In this copy management table, a storage apparatus 2201, data 2202, a starting time instant 2203, an execution interval 2204, a subject job 2205, and a data saving requirement upper limit time 2206 can be set. The storage apparatus 2201 is set in the case that a storage apparatus of a copy source is specified. In this case, all of data that the set storage apparatus becomes the copy source constitute the subject, and then, the data are saved in accordance with the priority degrees. When a setting operation is performed, both the storage apparatus 2201 and the data 2202 may be set, or any one of then may be alternatively set. Both the starting time instant 2203 and the execution interval 2204 are used so as to determine an execution time instant for saving data. After the starting time instant 2203, the data saving operations are executed in a predetermined time period by the execution interval 2204. The subject job 2202 is used to set a job name. Every time the set job is accomplished, the data saving operation is executed. It should be noted that the starting time instant 2203, the execution interval 2204, and the subject job 2205 may be selectively set, or both of these items may be set. The data saving requirement upper limit time 2206 is to set a time required to perform a data saving operation. While data is saved, since subject data is copied with a top priority, a copy priority degree of data other than the subject data is decreased. In a certain case, a copying operation is stopped. If this status is continued for a long time, then such a data which is not copied for a long time may occur. To avoid this problem, the data saving requirement upper limit time 2206 is set. FIG. 22 indicates that as to data DB-A and DB-B of a storage apparatus identifier 001, a data saving operation is carried out with a top priority only for 1 minute every 24 hours from 0 hour elapse, or every time JOB1 of a business program is accomplished. As previously explained, these items may be selectively set.

Figure 23:
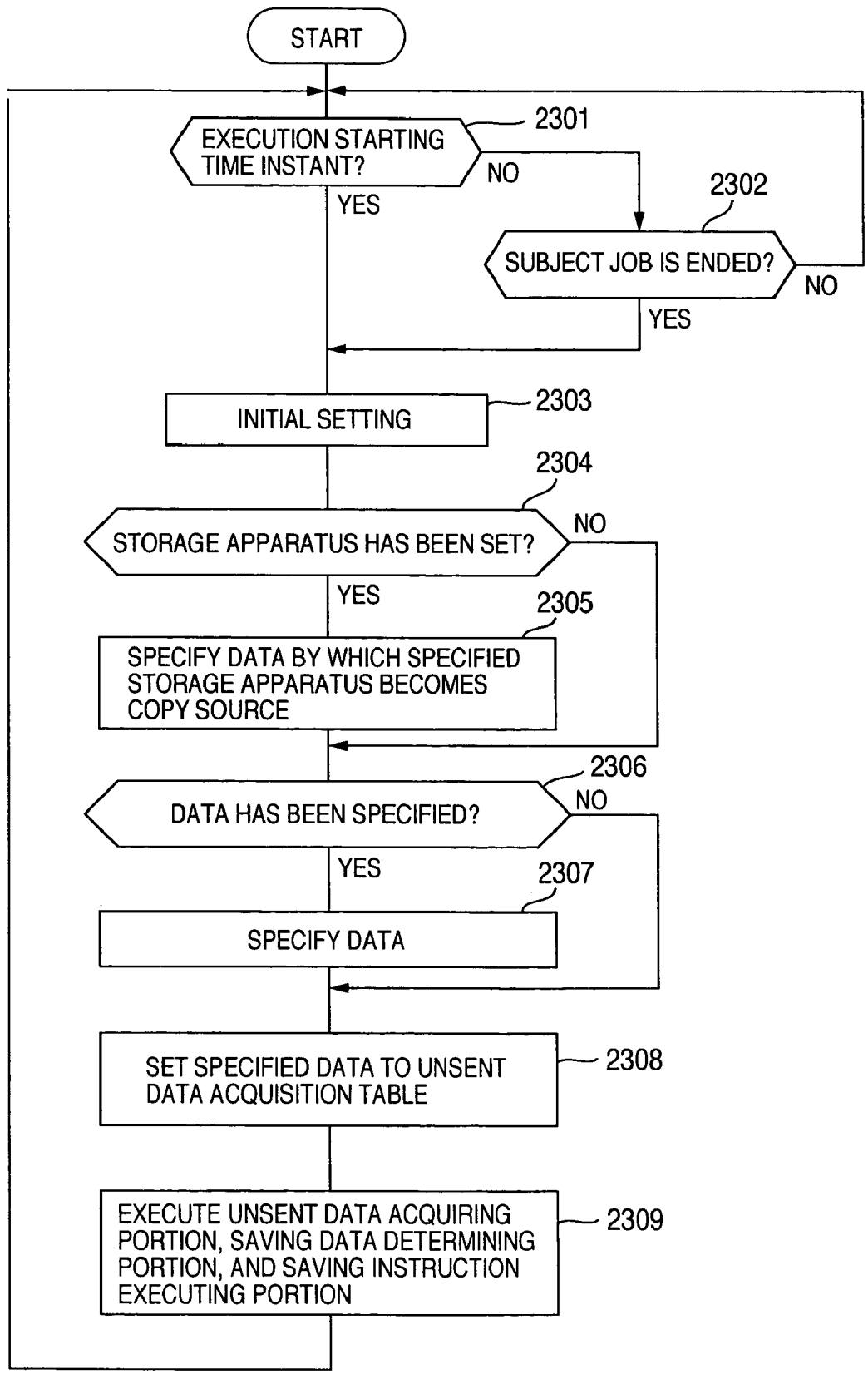
FIG. 23 is a flow chart for indicating process operations of a data save determining portion.

FIG. 23 is a flow chart for representing process operations of the copy control program 111 which is executed by setting the copy management table.

When the copy management table is set, the copy control program 111 executes process operations.

First, the copy control program 111 judges as to whether or not the present time reaches an execution starting time instant based upon the execution starting time instant 2203, the execution interval 2204, and a clock of a host 101 (step 2301). When the present time instant reaches the execution starting time instant, an initial setting operation is performed (step 2301). If the present time instant does not reach the execution starting time instant, then the copy control program 111 judges as to whether or not the subject job 2205 is accomplished (step 2302). If the subject job 2205 is accomplished, then the copy control program 111 executes an initial setting operation (step 2303). If the subject job 2205 is not yet completed, then the process operation is returned to the step 2201. It should be understood that when a business program is constituted by a plurality of process operations, a job corresponds to a unit of this process operation. Alternatively, the business program may be employed as a unit.

The above-explained initial setting operation implies that values which are set to the unsent data list table 216 and the saving data list table 217 are deleted (cleared).

Next, the copy control program 111 judges as to whether or not the storage apparatus 2201 has been set (step 2304), and if the storage apparatus 2201 has been set, then the set storage apparatus 2201 specifies such a data corresponding to a storage apparatus of a copy source (step 2305).

Next, the copy control program 111 judges as to whether or not the data 2202 has been set (step 2306). In the case that the copy control program 111 judges that the storage apparatus 2201 has not been set in the step 2304, then the copy control program 111 judges as to whether or not data has been specified (step 2306). If the data 2202 has been set, then the data is specified (step 2307), and then, the specified data is set to the unsent data acquisition table 215 (step 2308). If the data 2202 has not been set, then the data specified in the step 2305 is set to the unsent data acquisition table 215 (step 2308). Next, "0" is set to an acquisition flag of the unsent data list table 216 so as to execute the unsent data acquiring portion 202, the saving data determining portion 203, and the saving instruction executing portion 204 (step 2309), and then, the process operation is returned to the step 2301. As a consequence, the process operations as to the unsent data acquiring portion 202, the saving data determining portion 203, and the saving instruction executing portion 204 are carried out in parallel to the present process operations.

Figure 24:
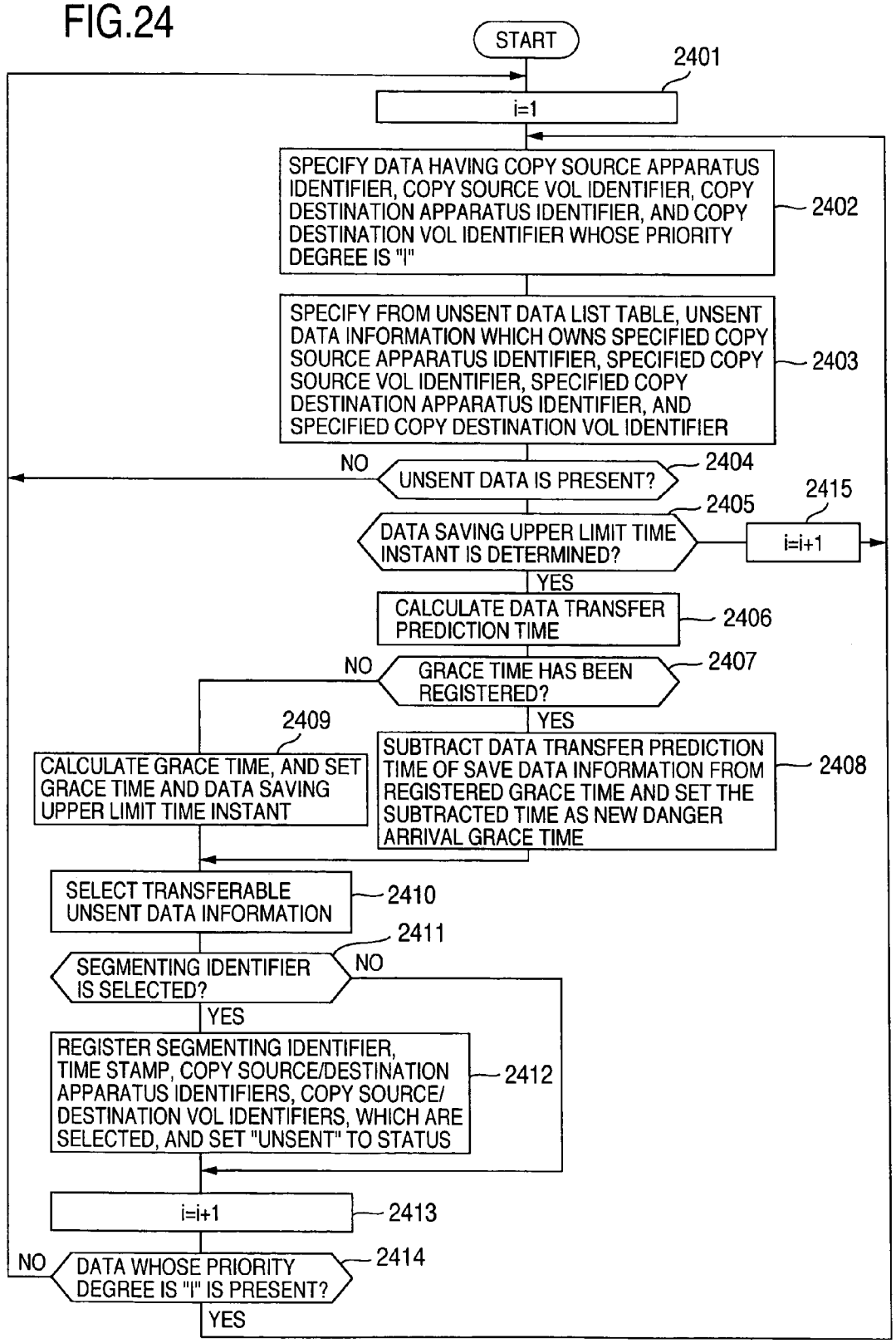
FIG. 24 is a flow chart for explaining process operations of a saving data determining portion.

FIG. 24 is a flow chart for showing process operations of the saving data determining portion 203.

Although the process operations of the saving data determining portion 203 are substantially same as the process operations shown in FIG. 7, the following process operation is different. That is, process operation for judging as to whether or not a data saving upper limit time instant is determined in a step 2405 is different from that of FIG. 7. The data saving upper limit time instant is calculated from the execution starting time instant 2203, the execution interval 2204, and the data saving upper limit time 2206, and implies such a time instant that a data saving process operation is accomplished. As a consequence, in such a case that the data saving upper limit time 2206 has been set, the saving data determining portion 203 judges that there is a data saving upper limit time instant. To the contrary, in such a case that the data saving upper limit time 2206 has not been set, the saving data determining portion 203 judges that there is no data saving upper limit time instant. When the data saving upper limit time instant is not present, the saving data determining portion 203 acquires a next priority degree (step 2415), and the process operation is returned to the step 2402.

In such a case that the data saving upper limit time instant is present, the saving data determining portion 203 calculates a data transfer prediction time (data amount/data transfer speed) based upon a line speed and a data amount for every segmenting identifier (step 2406). Next, the saving data determining portion 203 judges as to whether or not a grace time has been registered in the saving data list table 217 (step 2407). When the grace time has not been registered in the saving data list table 217, ("No" in step 2407), the saving data determining portion 203 calculates a remaining time (grace time) up to the data saving upper time limit based upon the data saving upper limit time instant and the present time instant measured by the clock of the host 101, and then, sets the spare time acquired from the saving data list table 217, and the data saving upper limit time instant (step 2409). When the grace time has already been registered in the saving data list table 217, ("YES" in step 2407), the saving data determining portion 203 calculates such a time obtained by subtracting the data transfer prediction time of the saving data information registered in the saving data list table 217 from the registered grace time, and then, defines the calculated time as a new grace time (step 2408).

Then, based upon the calculated data transfer prediction time and the grace time, the saving data determining portion 203 specifies unsent data information which can be transferred within the grace time in the order of smaller time stamps (namely, in the order of older data) (step 709).

Next, the copy control program 111 judges as to whether or not the unsent data information has been specified (step 2411). When the unsent data information has been specified, this unsent data information is registered as the saving data information 365 of the saving data list table 217, and "unsent" is set to the status (step 2412). Next, the copy control program 111 sets i=i+1 (step 2413), and judges as to whether or not data whose priority degree is "i" has been registered in the data saving destination list table 214 (step 2414). When such a data has been registered, the process operation is commenced from the step 2402. If such a data has not been registered, then the process operation is returned to the step 2401 in which the same process operation is carried out from the priority degree 1.

Figure 25:
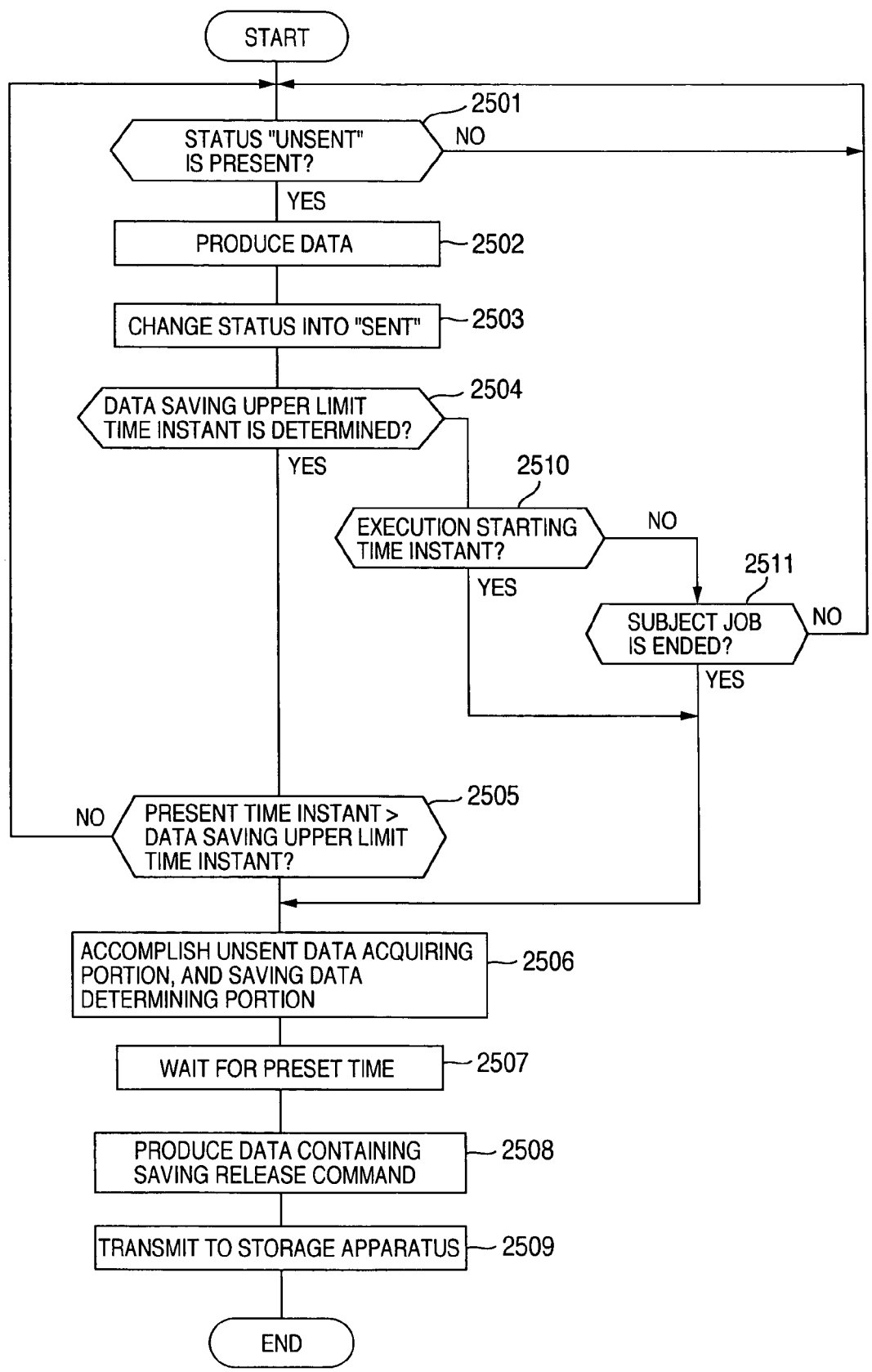
FIG. 25 is a flow chart for describing process operations of a saving instruction executing portion.

FIG. 25 is a flow chart for explaining process operations of he saving instruction executing portion 205.

The process operations of the saving instruction executing portion 205 are substantially equal to the process operations shown in FIG. 8. However, there are different points in a process operation for judging as to whether or not a data saving upper limit time instant has been set in a step 2504, and a process operation for judging as to whether or not the present time instant exceeds the data saving upper limit time instant in a step 2505. When the data saving upper limit time instant has not been determined in the step 2505, the saving instruction executing portion 205 judges as to whether or not the present time instant reaches the execution starting time instant based upon the execution starting time instant 2203, the execution interval 2204, and the clock of the host 101. In the case that the present time instant is not the execution starting time instant, the saving instruction executing unit 205 judges as to whether or not a subject JOB has been completed. In such a case that the present time instant is not the execution starting time instant, but also, the subject JOB has not yet been completed, the process operation is returned to the step 2501. In such a case that the present time instant reaches the execution starting time instant, or the subject JOB has already been completed, the unsent data acquiring portion 202 and the saving data determining portion 203 are accomplished (step 2506). In other words, in the case that the data saving upper limit time instant is not determined, namely, the data saving upper limit time is not set, there are some possibilities that the data saving operation is continued until the starting time instant of the next data saving operation. In this case, the previously-explained data saving operation is once ceased, and then, the data saving operation is newly performed.

It should be noted that as to other steps 2506 to 2509, the same process operations as those defined from the steps 805 to 808 of FIG. 8 are carried out.

As to process operations other than the above-explained process operations, similar process operations to those as explained above are carried out. It should also be understood that the explanation as to the occurrence prediction time instant should be replaced by the data saving upper limit time instant, and also, the explanation as to the danger arrival grace time should be replaced by the grace time.

As a consequence, the copying operation of the data is carried out under such a condition which is set in the copy management table. In other words, the data saving operation can be carried out with a top priority under such a condition (either time instant or execution end of JOB) which is determined by the manager.

Further, the expressions as to "data save" and "data copy" in this embodiment imply that data which is identical to data stored in a certain volume is stored in another volume. Another expression as to "data backup" similarly implies that data which is identical to data stored in a certain volume is stored in another volume.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data transfer system comprising:
a host computer stored with at least one business program each repeatedly executing a business processing; a first storage apparatus connected to said host computer via a network; and a second storage apparatus connected to said first storage apparatus via the network, in which said first storage apparatus which receives a data storage request from said host computer transmits said data to said second storage apparatus in asynchronism with storing operation of the data into a first storage area owned by said first storage apparatus and backs up said data to said second storage apparatus, wherein:
said host computer is configured to transmit said data storage request in response to receiving disaster prediction information;
said host computer attaches an identifier indicative of an end of the business processing to a data storage request and transmits the data storage request with the respective identifier to said first storage apparatus;
said first storage apparatus calculates a respective data amount of data which is to be backed up to said second storage apparatus but has not yet been sent thereto for every said identifier based upon the respective data storage request issued from said host computer, and transmits both said identifier and said respective data amount as calculated to said host computer, the respective data amounts corresponding to the identifiers are different in accordance with different business processing;
said host computer selects at least one specific identifier from the identifiers received from said first storage apparatus based upon said respective data amount received from said first storage apparatus such that data corresponding to the selected identifier can be transmitted within a predetermined time interval, and transmits the selected identifier to said first storage apparatus; and
said first storage apparatus transmits data grouped by said selected identifier to said second storage apparatus with a top priority and prior to a disaster occurrence prediction time, and backs up said grouped data into said second storage apparatus.

2. A data transfer system as claimed in claim 1, wherein:
said host computer specifies data which constitutes a transmission source of data by said first storage apparatus, and requests a data amount of data which is to be backed up but has not yet been transmitted from said first storage apparatus to said second storage apparatus to said first storage apparatus with respect to the specified data.

3. A data transfer system as claimed in claim 2, wherein:
said host computer transmits said request to said first storage apparatus in a periodic manner based upon predetermined time information determined with a data copying completion time and a disaster arrival grace time.

4. A data transfer system as claimed in claim 1, wherein:
said host computer receives a notification of disaster information, and specifies said identifier from a data amount which can be sent to said second storage apparatus until the disaster occurrence prediction time contained in said disaster information.

5. A data transfer system as claimed in claim 1, wherein:
said host computer specifies said identifier from a data amount which can be sent to said second storage apparatus up to a predetermined data save completion time instant.

6. A data transfer system as claimed in claim 1, wherein:
said host computer has a value by which said first storage apparatus can withstand disaster, and compares a disaster prediction value contained in the disaster information with said disaster withstandable value; and
in the case that the disaster prediction value is larger than the disaster withstandable value, said host computer requests said first storage apparatus to notify an error with respect to the data storage request for said first storage apparatus.

7. A data transfer system as claimed in claim 5, wherein:
said host computer transmits a request for releasing said error notification to said first storage apparatus.

8. A data transfer system as claimed in claim 1, wherein:
the data which is sent from said first storage apparatus to said second storage apparatus corresponds to data which contains both the data sent from said host computer and update information related to the data storage request; and said data is transmitted from said first storage apparatus to said second storage apparatus in response to a request issued from said second storage apparatus.

9. A data transfer system as claimed in claim 7, wherein:
in the case that said first storage apparatus receives the identifier specified by said host computer, said first storage apparatus instructs said second storage apparatus in such a manner that a transmission request of data related to said identifier is sent to said second storage apparatus.

10. An information processing system comprising:
a host computer which is stored with at least one business program each repeatedly executing a business processing and attaches an identifier indicative of an end of the business processing to a data storage request, to issue the data storage request with the respective identifier;
a second storage apparatus having a storage area; and
a first storage apparatus connected to said host computer and said second storage apparatus via a network, which stores data into a first storage area upon receipt of the data storage request from said host computer, transmits said data to said second storage apparatus in asynchronism with said data storage operation and backs up said data to said second storage apparatus; wherein:
said host computer is configured to transmit said data storage request in response to receiving disaster prediction information;
said first storage apparatus calculates a respective data amount of data which is to be backed up to said second storage apparatus within a predetermined time interval but has not yet been sent thereto for every said identifier based upon the respective data storage request issued from said host computer, and transmits both said identifier and respective data amount as calculated to said host computer; and also transmits data grouped by at least one identifier selected by the host computer to said second storage apparatus prior to a disaster occurrence prediction time, and back ups said grouped data into said second storage apparatus, the respective data amounts corresponding to the identifiers are different in accordance with different business processing.

11. An information processing system as claimed in claim 10 wherein:
said host computer specifies data which constitutes a transmission source of data by said first storage apparatus, and requests a data amount of data which is to be backed up but has not yet been transmitted from said first storage apparatus to said second storage apparatus to said first storage apparatus with respect to the specified data.

12. An information processing system as claimed in claim 11 wherein:
said host computer transmits said request to said first storage apparatus in a periodic manner based upon predetermined time information determined with a data copying completion time and a disaster arrival grace time.

13. An information processing system as claimed in claim 10 wherein:
said host computer receives specifies said identifier from a data amount which can be sent to said second storage apparatus until the disaster occurrence prediction time contained in said disaster information.

14. An information processing system as claimed in claim 10 wherein:
said host computer specifies said identifier from a data amount which can be sent to said second storage apparatus up to a predetermined data save completion time instant.

15. An information processing system as claimed in claim 10 wherein:
said host computer has a value by which said first storage apparatus can withstand disaster, and compares a disaster prediction value contained in the disaster information with said disaster withstandable value; and in the case that the disaster prediction value is larger than the disaster withstandable value, said host computer requests said first storage apparatus to notify an error with respect to the data storage request for said first storage apparatus.

16. An information processing system as claimed in claim 10 wherein:
said host computer transmits a request for releasing said error notification to said first storage apparatus.

17. An information processing system as claimed in claim 10 wherein:
said first storage apparatus produces data which contains both the data sent from said host computer and update information related to the data storage request, and transmits said produced data to said second storage apparatus in response to a request issued from said second storage apparatus.

18. An information processing system as claimed in claim 17 wherein:
in the case that said first storage apparatus receives the identifier specified by said host computer, said first storage apparatus instructs said second storage apparatus in such a manner that a transmission request of data related to said identifier is sent to said second storage apparatus.

19. An information processing system as claimed in claim 10 wherein:
said first storage apparatus stores into a second storage area, such a data which contains the data and update information related to the storage request with respect to the data stored in a first storage area, and also, stores a copy of data of said first storage area at a predetermined time instant into a third storage area; and
in the case that said first storage apparatus receives a prediction time instant of a disaster occurrence from said host computer, said first storage apparatus produces data at a time before said prediction time instant from said data stored in said second storage area and said data stored in said third storage area.

20. A data transfer method operable in a system including a host computer stored with at least one business program each repeatedly executing a business processing, a first storage apparatus connected to said host computer and a second storage apparatus via a network, in which said first storage apparatus which receives a data storage request from said host computer, transmits said data to said second storage apparatus in asynchronism with storing operation of the data into a first storage area owned by said first storage apparatus and backs up said data to said second storage apparatus, the method comprising the steps of:
attaching, at said host computer, an identifier indicative of an end of the business processing to a data storage request;
transmitting the data storage request with the respective identifier to said first storage apparatus in response to said host computer receiving disaster prediction information;
calculating, at said first storage apparatus, a respective data amount of data which is to be moved to said second storage apparatus within a predetermined time interval but has not yet been sent thereto for every said identifier based upon the respective data storage request issued from said host computer, the respective data amounts corresponding to the identifiers are different in accordance with different business processing;

transmitting both said identifier and said respective data amount as calculated to said host computer;

selecting, at said host computer, at least one specific identifier from the identifiers received from said first storage apparatus, based upon said respective data amount received from said first storage apparatus;

still further transmitting the selected identifier to said first storage apparatus; and transmitting, at said first storage apparatus, data grouped by said selected identifier to said second storage apparatus with a top priority and prior to a disaster occurrence prediction time, and backing up said grouped data into said second storage apparatus.

* * * * *